(12) United States Patent
Amako et al.

(10) Patent No.: US 7,972,017 B2
(45) Date of Patent: Jul. 5, 2011

(54) OPTICAL ELEMENT HAVING A DIFFRACTIVE LAYER AND A RELIEF PATTERN WITH CONCAVE AND CONVEX PORTIONS

(75) Inventors: Jun Amako, Matsumoto (JP); Daisuke Sawaki, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 12/754,225

(22) Filed: Apr. 5, 2010

(65) Prior Publication Data
US 2010/0188747 A1    Jul. 29, 2010

Related U.S. Application Data

(63) Continuation of application No. 12/132,810, filed on Jun. 4, 2008, now Pat. No. 7,722,194.

(30) Foreign Application Priority Data

Jun. 7, 2007    (JP) .................................. 2007-151225
Apr. 30, 2008   (JP) .................................. 2008-118149

(51) Int. Cl.
  G03B 21/28    (2006.01)
  G02F 1/13     (2006.01)
  G02B 5/18     (2006.01)
  G02B 6/34     (2006.01)

(52) U.S. Cl. ............ 353/98; 353/20; 349/201; 359/576; 385/11; 385/37

(58) Field of Classification Search .................... 353/98, 353/20; 349/201, 96, 5; 359/576, 569; 385/11, 385/37
See application file for complete search history.

(56) References Cited

U.S. PATENT DOCUMENTS

| | | | |
|---|---|---|---|
| 6,927,915 B2 * | 8/2005 | Nakai | 359/569 |
| 7,722,194 B2 * | 5/2010 | Amako et al. | 353/98 |
| 7,755,718 B2 * | 7/2010 | Amako et al. | 349/96 |
| 2006/0127830 A1 | 6/2006 | Deng et al. | |
| 2007/0087549 A1 * | 4/2007 | Yamaki et al. | 438/613 |
| 2008/0266662 A1 | 10/2008 | Perkins | |
| 2008/0304004 A1 | 12/2008 | Amako et al. | |

FOREIGN PATENT DOCUMENTS

JP   A 2002-372749    12/2002
JP   A 2006-133275    5/2006

* cited by examiner

*Primary Examiner* — Georgia Y Epps
*Assistant Examiner* — Magda Cruz
(74) *Attorney, Agent, or Firm* — Oliff & Berridge, PLC

(57) ABSTRACT

An optical element, includes: a diffractive functional layer which diffracts at least part of incident light; and a grid formed on a first surface of the diffractive functional layer, the grid including a plurality of fine wires and having a polarization separation function; wherein the optical element reflects a part of the incident light while transmitting another part of the incident light, the first surface of the diffractive functional layer including: a plurality of first regions; a plurality of second regions, a height thereof relative to a second surface of the diffractive functional layer being different from that of the first regions, the second surface being an opposite surface to the first surface; and a step provided at a border between the first regions and the second regions.

5 Claims, 19 Drawing Sheets

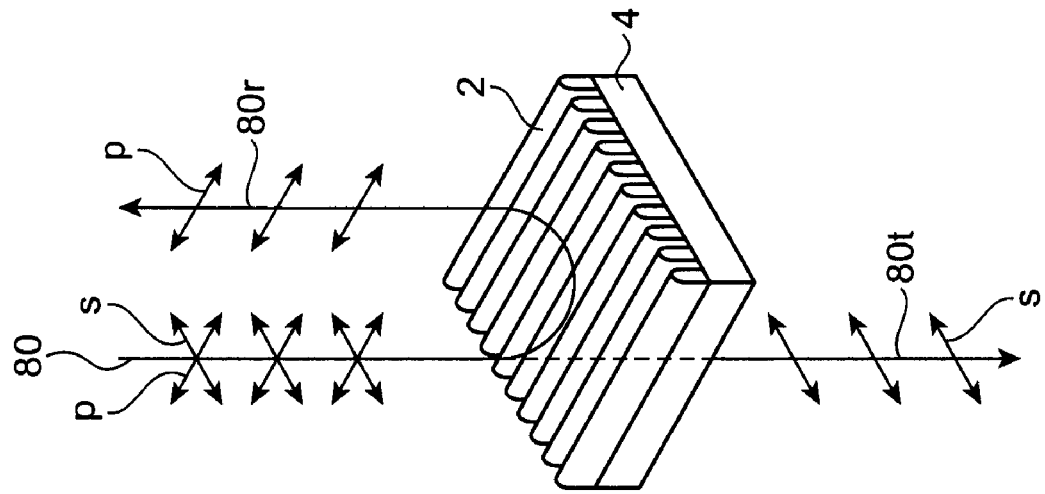
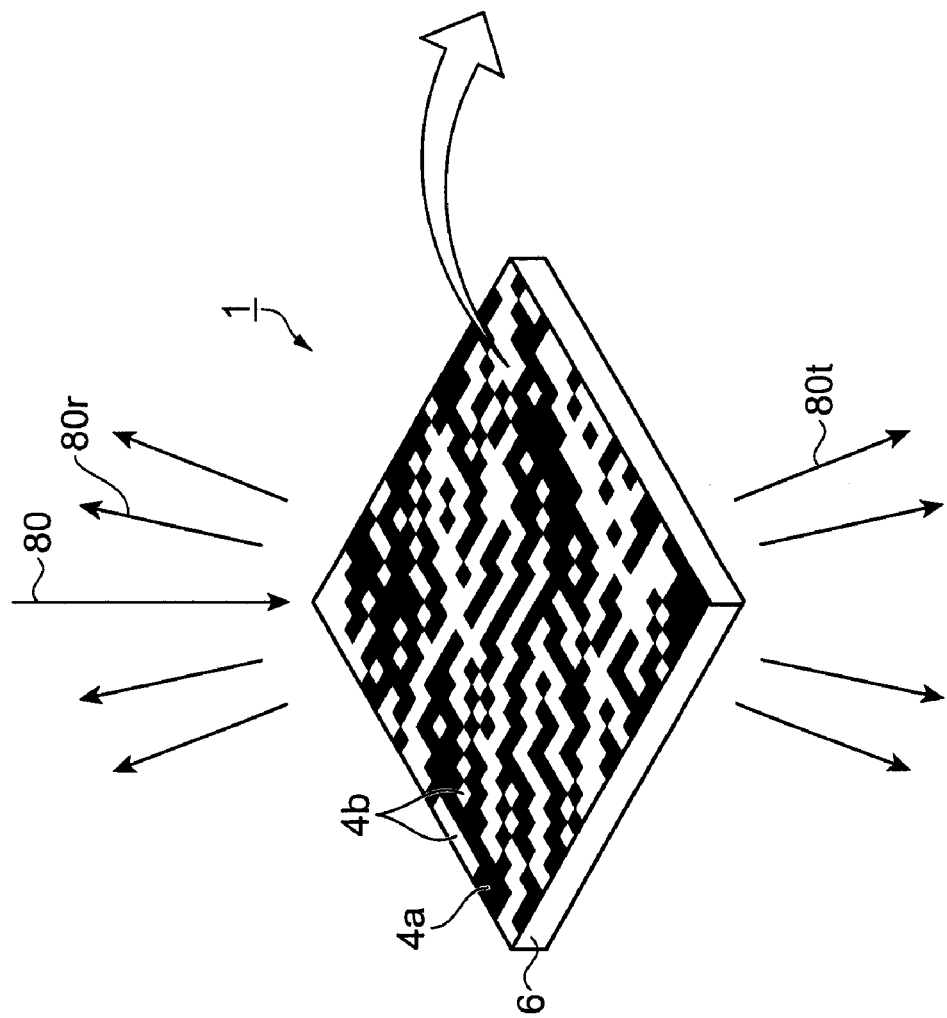
FIG. 3B
FIG. 3A

OPTICAL ELEMENT HAVING A DIFFRACTIVE LAYER AND A RELIEF PATTERN WITH CONCAVE AND CONVEX PORTIONS

This is a Continuation of application Ser. No. 12/132,810 filed Jun. 4, 2008, which claims priority of Japanese Patent Applications Nos. 2007-151225 and 2008-118149 filed Jun. 7, 2007 and Apr. 30, 2008, respectively. The disclosure of the prior applications is hereby incorporated by reference herein in its entirety.

BACKGROUND

1. Technical Field

Several aspects of the present invention relate to an optical element as well as to a projection display device.

2. Related Art

Wire-grid polarizers are known as one of the optical elements provided with a polarization separation function. These wire-grid polarizers have multiple conductive fine wires arranged at a pitch shorter than the wavelength of light, and they reflect an incident light component that has a polarization axis parallel to the fine wires, while transmitting another component that has a polarization axis orthogonal to the fine wires.

Wire-grid polarizers are formed of an inorganic substance and therefore excel in light resistance. For this reason, there are attempts to apply these wire-grid polarizers to projection display devices such as projectors which require to polarize and separate high luminance light (refer to JP-A-2002-372749). FIG. 22 is a schematic drawing illustrating an example of a configuration of a projection display device using two wire-grid polarizers 5. As shown in this drawing, a liquid crystal device 10 is interposed between the two wire-grid polarizers 5, and light is incident to the liquid crystal device 10 from one of the wire-grid polarizers 5. This incident light is converted to display light by the polarization separation function of the wire-grid polarizers 5 at both the entry and exit side, as well as by the polarization conversion function of the liquid crystal device 10. The display light is then projected to a screen 61 through a projection lens 51.

In the above structure, however, the specular reflection of the light by one of the wire-grid polarizers 5 arranged on the exit side of the liquid crystal device 10 occurs. Therefore, the reflected intense light irradiates part of the liquid crystal device 10. This results in problems of the reduced lifetime or unstable operation of the liquid crystal device 10.

SUMMARY

An advantage of the invention is to provide an optical element having a reflected light diffusing function and a polarization separation function.

According to a first aspect of the invention, an optical element includes a diffractive functional layer which diffracts at least part of incident light, and a grid formed on a first surface of the diffractive functional layer, the grid including a plurality of fine wires and having a polarization separation function. Here, the optical element reflects a part of the incident light while transmitting another part of the incident light, and the first surface of the diffractive functional layer includes a plurality of first regions, a plurality of second regions, and a step provided at a border between the first regions and the second regions. The height of the plurality of second regions relative to a second surface of the diffractive functional layer is different from that of the first regions, and the second surface is a surface opposite to the first surface.

In this structure, a plurality of relief patterns composed of the first regions and the second regions is distributed on the first surface of the diffractive functional layer. The distribution of relief patterns allows the diffractive functional layer to diffract the incident light, so that the light is diffused to directions different from the direction of incidence.

An incident light component that has a polarization axis parallel to the fine wires is reflected at the grid, and another component that has a polarization axis orthogonal to the fine wires is transmitted. Consequently, with the optical element, the incident light beam is separated into a reflected light beam and a transmitted light beam, and the reflected light beam is diffused out.

In this case, the height relative to the second surface in the first regions of the optical element may be different from that of the second regions by $(2m+1)\lambda/4n$, where m being an integer greater than or equal to 0, $\lambda$ being a wavelength of the incident light, and n being a refraction index of the medium over the optical element.

In this structure, the height difference of the first regions and the second regions being $(2m+1)\lambda/4n$ maximizes the diffusion effect of the reflected light by the diffractive functional layer. Since the diffusion effect of the transmitted light is not necessarily the highest at this point, the intensity of $0^{th}$ order diffraction light of the light transmitted through the diffractive functional layer stays almost intact while reducing the diffusion effects on the transmitted light. Consequently, with the optical element, the incident light beam is separated into a reflected light beam and a transmitted light beam, and at the same time, the reflected light is diffused out while the transmitted light is not.

In this case, the height relative to the second surface in the first regions of the optical element may be different from that of the second regions by $(m+1)\lambda/(N-1)$, where m being an integer greater than or equal to 0, $\lambda$, being the wavelength of the incident light, and N being a refraction index of the diffractive functional layer.

This structure minimizes the diffusion effects on the transmitted light.

In this case, a plane defined by the height of the first regions and a plane defined by the height of the second regions may be in parallel.

In this structure, the light simultaneously enters the first regions as well as the second regions at the same angle. Therefore, the grid is easily formed on the diffractive functional layer with photolithography.

In this case, the first regions may be irregularly arranged on the first surface.

With this structure, relief patterns composed of the first regions and the second regions are irregularly distributed on one surface of the diffractive functional layer, without rules or statistical biases. Therefore, the incident light may be diffused into various directions, thereby extending the diffusion range of the reflected light originating from the optical element.

In this case, the optical element according to the first aspect of the invention may further include a plurality of unit patterns, each of the unit patterns including the plurality of first regions and the plurality of second regions arranged in a specified irregular distribution.

This structure allows a photomask used for manufacturing the diffractive functional layer to have a structure in which each mask pattern equivalent to the above unit pattern is arranged in repetition, thereby making the forming of the photomask as well as the manufacturing of the optical element easier.

In this case, directions of the adjacent unit patterns may be different from each other.

Such a structure prevents nonuniform diffusion of the reflected light, the nonuniformity being caused by the repetition cycle of the unit patterns.

In this case, a periphery of the first regions and a periphery of the second regions may respectively include a straight line, and the fine wires may be arranged at an angle to the straight line.

This structure makes the fine wires unparallel to the step provided at the border between the first regions and the second regions, thereby avoiding defects in which the fine wires arranged in the vicinity of the steps become unstable.

In this case, the diffractive functional layer may be formed of a material different from that of the grid, the material having transparency.

Such a structure allows the optical element, to let out the light component that has transmitted through the grid, making the optical element semi-transmissive-reflective.

In this case, the optical element may further include an adhesive layer formed between the diffractive functional layer and the grid, and this adhesive layer may be formed with a material different from that of the diffractive functional layer and that of the grid. Moreover, an adhesive strength between the diffractive functional layer and the adhesive layer, as well as an adhesive strength between the grid and the adhesive layer may be higher than that of between the diffractive functional layer and the grid.

In such a structure, the adhesiveness between the grid and the diffractive functional layer is improved by having the adhesive layer therebetween.

According to a second aspect of the invention, an optical element includes a diffractive functional layer which diffracts at least part of incident light, and a grid formed on a first surface of the diffractive functional layer, the grid including a plurality of fine wires and having a polarization separation function. Here, the optical element reflects a part of the incident light while transmitting another part of the incident light, and the first surface of the diffractive functional layer includes a plurality of regions and a step provided at a border between the plurality of regions. The plurality of regions has a different height relative to a second surface of the diffractive functional layer, and the second surface is a surface opposite to the first surface.

In this case, the plurality of regions having a different height may have a distribution within the optical element, and the difference of height relative to the second surface of the optical element in the plurality of regions having a different height may be $(2m+1)\lambda/4n$, where m being an integer greater than or equal to 0, $\lambda$ being a wavelength of the incident light, and n being a refraction index of the medium over the optical element.

In this case, the plurality of regions having a different height may have a distribution within the optical element, and the difference of height relative to the second surface of the optical element in the plurality of regions having a different height may be $(m+1) \lambda/(N-1)$, where m being an integer greater than or equal to 0, $\lambda$ being a wavelength of the incident light, and N being a refraction index of the optical element.

In these structures described according to the second aspect of the invention, different heights are distributed in an appropriate ratio, the heights corresponding, for instance, to the wavelength bands at the center and at both edges of the incident light. Consequently, in these structures, the specularly reflected light is reduced compared to a structure including a height complying only with a specified wavelength.

According to a third aspect of the invention, a projection display device includes a liquid crystal device, a projection lens, and an optical element arranged at an optional position in an optical path from the liquid crystal device to the projection lens. Here, the optical element includes a diffractive functional layer which diffracts at least part of incident light, and a grid formed on a first surface of the diffractive functional layer, the grid including a plurality of fine wires and having a polarization separation function. The first surface of the diffractive functional layer includes a plurality of first regions, a plurality of second regions, and a step provided at a border between the first regions and the second regions. The plurality of second regions has a height relative to a second surface of the diffractive functional layer, and this height is different from that of the first region.

In this structure, the light transmitted through the liquid crystal device enters the optical element, and a light component is transmitted through the optical element, the component having a polarization axis orthogonal to the fine wires of the grid, thereafter entering the projection lens. Consequently, using the polarization separation function of the optical element allows display contents of the liquid crystal device to be projected through the projection lens.

Moreover, since the light reflected by the optical element is diffused by the polarization separation function of the diffractive functional layer, it is possible to prevent optical malfunctions originating from the reflected light striking on part of the liquid crystal device.

In this case, the height relative to the second surface in the first regions of the optical element may be different from that of the second regions by $(2m+1)\lambda/4n$, where m being an integer greater than or equal to 0, $\lambda$ being a wavelength of the incident light, and n being a refraction index of the optical element.

This structure maximizes the diffusion effect of the light reflected by the diffractive functional layer of the optical element. It is therefore possible to prevent optical malfunctions occurring if the light reflected from the optical element concentrates on part of the liquid crystal device. Since the diffusion effect of the transmitted light is not necessarily the highest at this point, the intensity of $0^{th}$ order diffraction light of the light transmitted through the diffractive functional layer remains unaffected, thereby reducing the diffusion effects on the transmitted light. Consequently, there is an increase in the proportion of light contributing to the display and being transmitted through the projection lens, with respect to the light transmitted through the liquid crystal device.

In this case, the projection display device may further include a prism arranged at an optional position in the optical path from the liquid crystal device to the optical element.

In this configuration, the course of light transmitted through the liquid crystal device can be changed by prism. Moreover, light beams transmitted through different liquid crystal devices through different optical paths can be combine by the prism, and the combined light beam becomes incident to the optical element.

In this case, the projection display device may further include a light-collecting lens arranged at an optional position in the optical path from the optical element to the projection lens.

In this configuration, the larger proportion of light transmitted through the optical element is incident to the projection lens, thereby increasing the light use efficiency.

BRIEF DESCRIPTION OF THE DRAWINGS

The invention will be described with reference to the accompanying drawings, wherein like numbers reference like elements.

FIG. 3 is a schematic view for describing a function of the optical element.

DESCRIPTION OF EXEMPLARY EMBODIMENTS

Figure 1A:
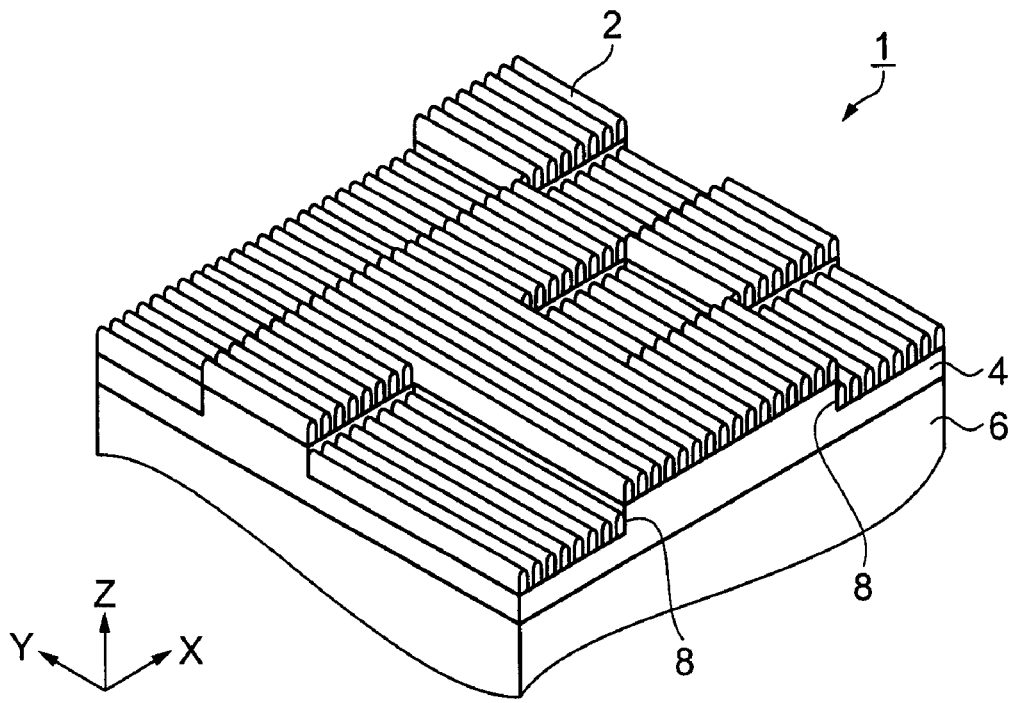
FIG. 1A is a perspective view of an optical element according to an embodiment.

Embodiments of an optical element as well as of a projection display device will now be described with reference to the accompanying drawings. Components in the drawings shown hereafter are provided with an appropriate scale size and a ratio different from the actual ones, so that those components will be sufficiently large to be recognized in the drawings.

A. An Optical Element

Figure 2A:
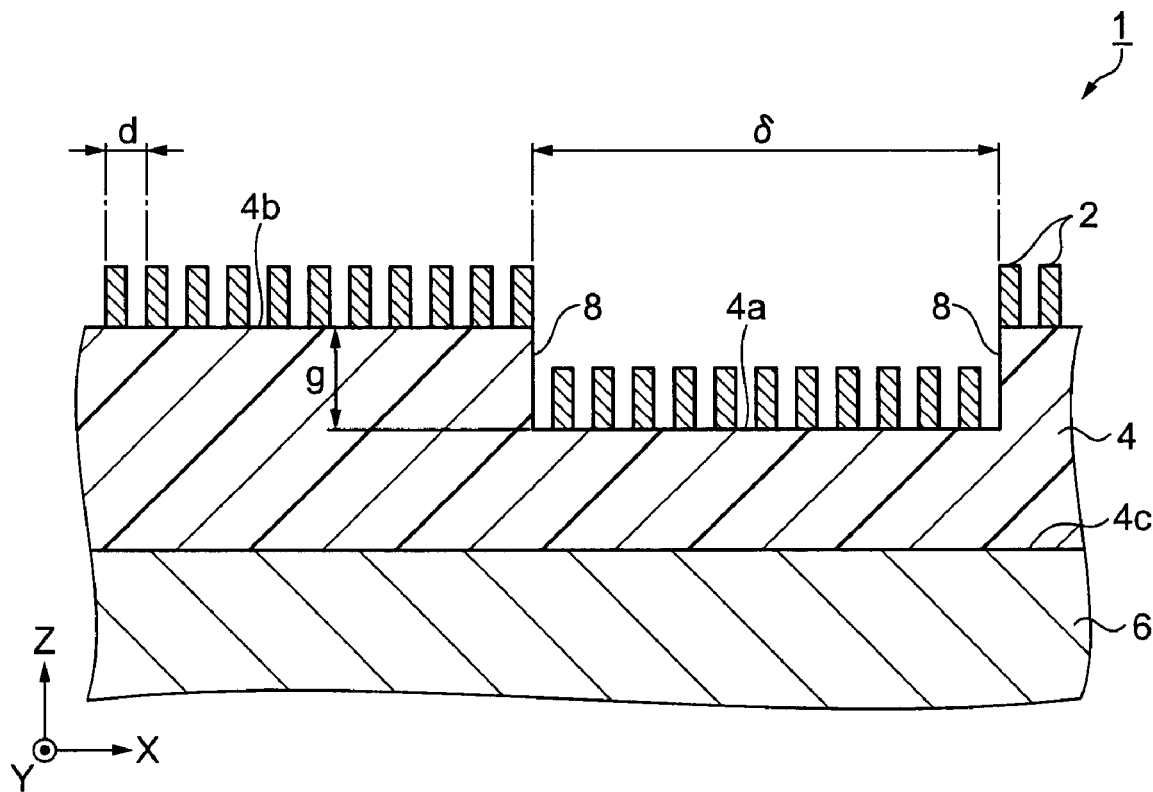
FIG. 2A is a sectional view along the X-Z plane of the optical element referred to in FIG. 1A.

FIG. 1A is a perspective view of an optical element 1 according to an embodiment, and FIG. 2A is a sectional view of the optical element 1 along the X-Z plane. The optical element 1 includes a base 6 formed with materials such as glass, a diffractive functional layer 4 arranged on the base 6, and a grid 2 arranged on the diffractive functional layer 4. FIG. 1A is a magnification of a part of the optical element 1, while the actual optical element has similar successive structures in a wider range of the X-Y plane.

Figure 1B:
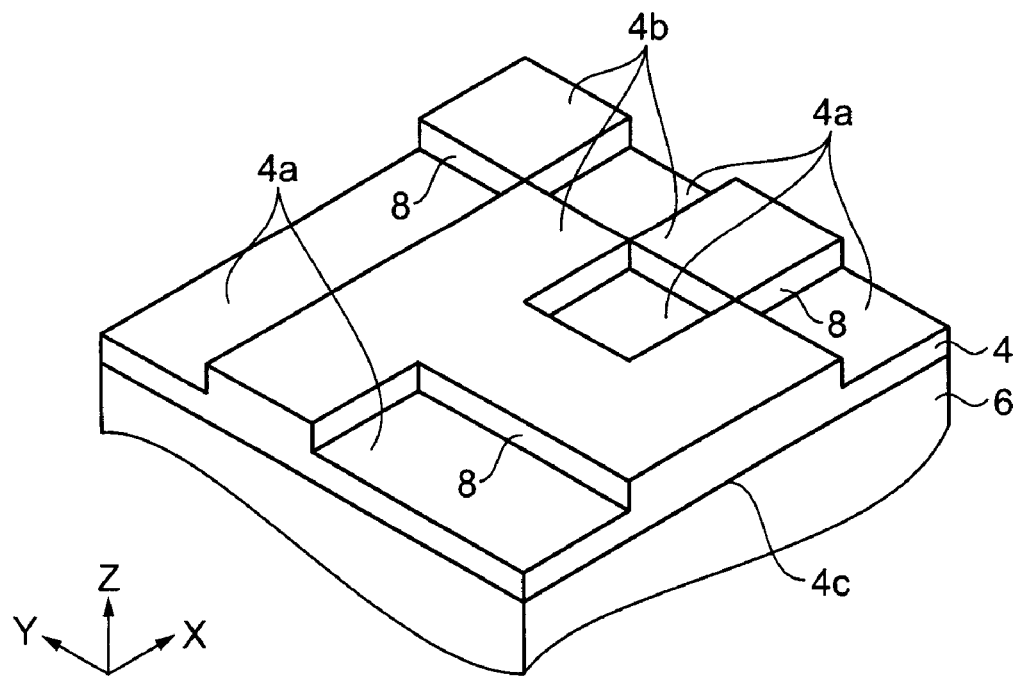
FIG. 1B is a perspective view illustrating the shape of a diffractive functional layer.

FIG. 1B is a perspective view illustrating the shape of the diffractive functional layer 4, with the grid 2 from FIG. 1A not shown. The diffractive functional layer 4 is formed with a polymer that is transparent to incident light, and multiple relief patterns are formed on one of the surfaces (hereafter also referred to as "first surface"). This first surface includes a plurality of first regions 4a and a plurality of second regions 4b. The height of the second regions 4b relative to another surface 4c (hereafter also referred to as "second surface 4c") of the diffractive functional layer 4 is different from the height of the first regions 4a, the second surface 4c being a surface that contacts the base 6. In this embodiment, the second regions 4b are higher than the first regions 4a. Steps 8 are provided in the borders between the first regions 4a and the second regions 4b. A height g of the steps 8 (FIG. 2A) are set to be smaller than the wavelength of the incident light. Moreover, the steps 8 are approximately vertical to the first regions 4a and the second regions 4b. In other words, the section of the diffractive functional layer 4 is approximately rectangular, i.e. the section has the shape of rectangular waves.

The first regions 4a and the second regions 4b are arranged at random (irregularly), and those regions are either squares or shapes like those squares being irregularly pieced placed lengthwise and crosswise in the X-Y plane. Here, the minimum size of the first regions 4a and the second regions 4b (i.e. the length of one side of the square) δ as shown in FIG. 2A is longer than a wavelength λ of the incident light. In case of using the diffractive functional layer 4 for visible light, the δ is set to, for instance, 2 μm. The first regions 4a and the second regions 4b are planes parallel to each other.

As shown in FIG. 1A, the grid 2 are actually formed on the first surface of the diffractive functional layer 4 (i.e. on the first regions 4a and on the second regions 4b). The grid 2 is composed with multiple aluminum fine wires that are parallel to each other. One of the straight periphery lines of the first regions 4a as well as one of the second regions 4b are in parallel with these fine wires. The arranged pitch d (FIG. 2A) of the fine wire is shorter than the wavelength λ of the incident light, and is set to, for instance, 140 nm. For the convenience of description, the number of fine wires drawn in FIG. 1A is smaller than actual.

Figure 2B:
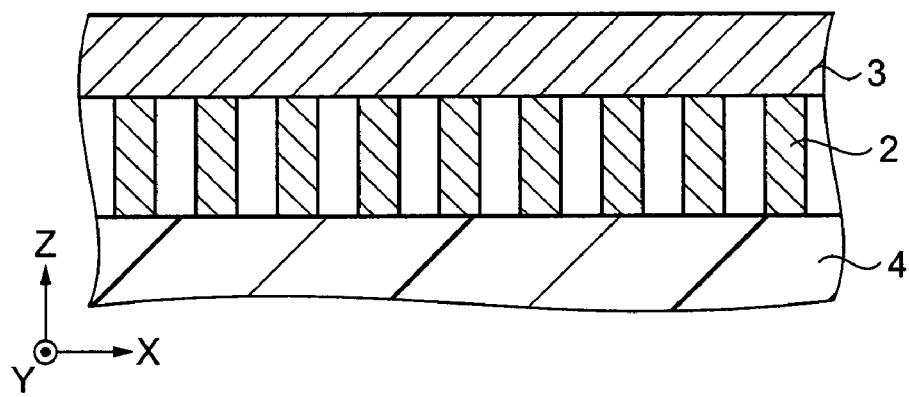
FIG. 2B is a sectional view magnifying a part of FIG. 2A.

FIG. 2B is a sectional drawing that magnifies a part of FIG. 2A. As shown in this drawing, the grid 2 is sealed by the sealing layer 3 formed of materials such as $SiO_2$ or SiN, and spaces surrounded by the diffractive functional layer 4, the grid 2, and the sealing layer 3 are in a vacuum state.

An adhesive layer formed of a material different from that of the diffractive functional layer 4 and the grid 2 may be formed therebetween. At this time, it is preferable that the adhesive strength between the diffractive functional layer 4 and the adhesive layer, as well as between the grid 2 and the adhesive layer be higher than the adhesive strength between the diffractive functional layer 4 and the grid 2. In such a structure, the adhesive layer improves the adhesiveness between the grid 2 and the diffractive functional layer 4. Examples of the adhesive layer includes a dielectric thin film formed of materials such as $SiO_2$.

FIG. 3 is a schematic view for describing functionalities of the optical element 1. FIG. 3A is a drawing illustrating the function of the diffractive functional layer 4, and FIG. 3B is a drawing illustrating the function of the grid 2.

As shown in FIG. 3B, an incident light 80 entering the grid 2 has a component p which has a polarization axis parallel to the fine wires and a component s which has a polarization axis orthogonal to the fine wires. The component p is reflected by the grid 2 and the component s is transmitted through the grid 2. The optical element 1 including the grid 2 is provided with a polarization separation function, and the incident light 80 is separated to a reflected light 80r and a transmitted light 80t that have different polarization statuses.

In the optical element 1 shown in FIG. 3A, the black regions are equivalent to the first regions 4a, and the white regions are equivalent to the second regions 4b. A plurality of relief patterns shaped by the first regions 4a and the second regions 4b is distributed on the first surface of the diffractive functional layer 4 (FIG. 1B). The diffractive functional layer 4 diffracts the incident light 80 with this distribution of concaves and convexes, so as to diffuse the light to directions different from the direction of incidence as shown in FIG. 3A. Specifically, the operation of the diffractive functional layer 4 allows diffusing both the reflected light 80r reflected by the grid 2 and the transmitted light 80t transmitted through the grid 2. Moreover, as will be described later, the diffusion characteristics of the reflected light 80r and the transmitted light 80t are adjustable.

Figure 4A:
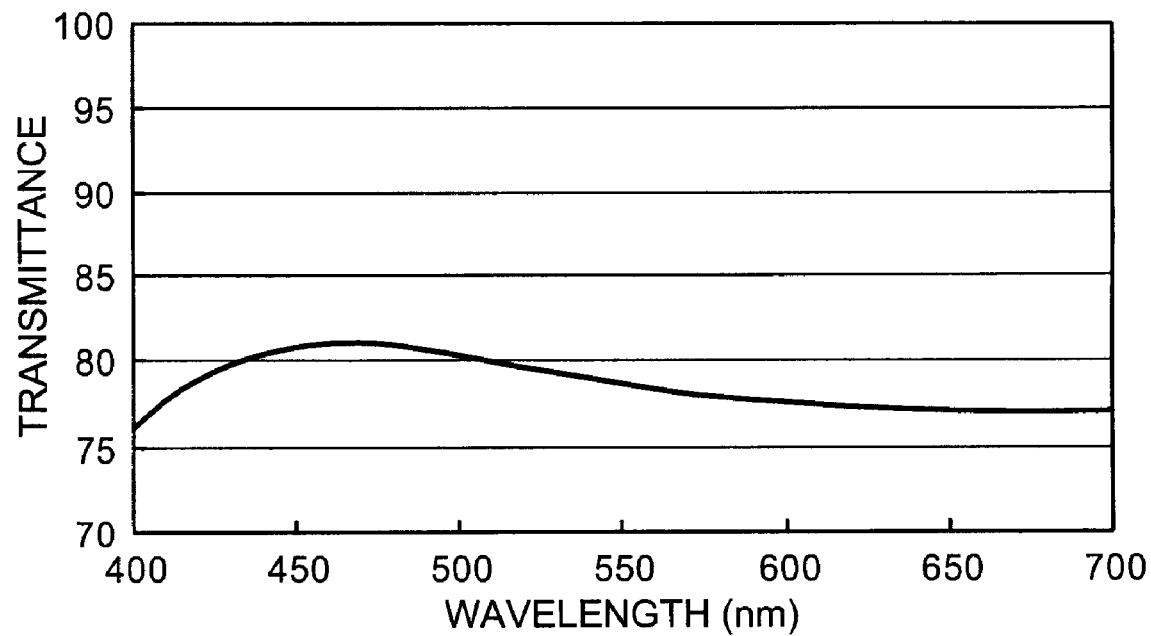
FIGS. 4A and 4B are graphs indicating characteristics of transmitted light in the optical element, where FIG. 4A indicates wavelength dependence of transmittance and FIG. 4B indicates wavelength dependence of contrast.
Figure 4B:
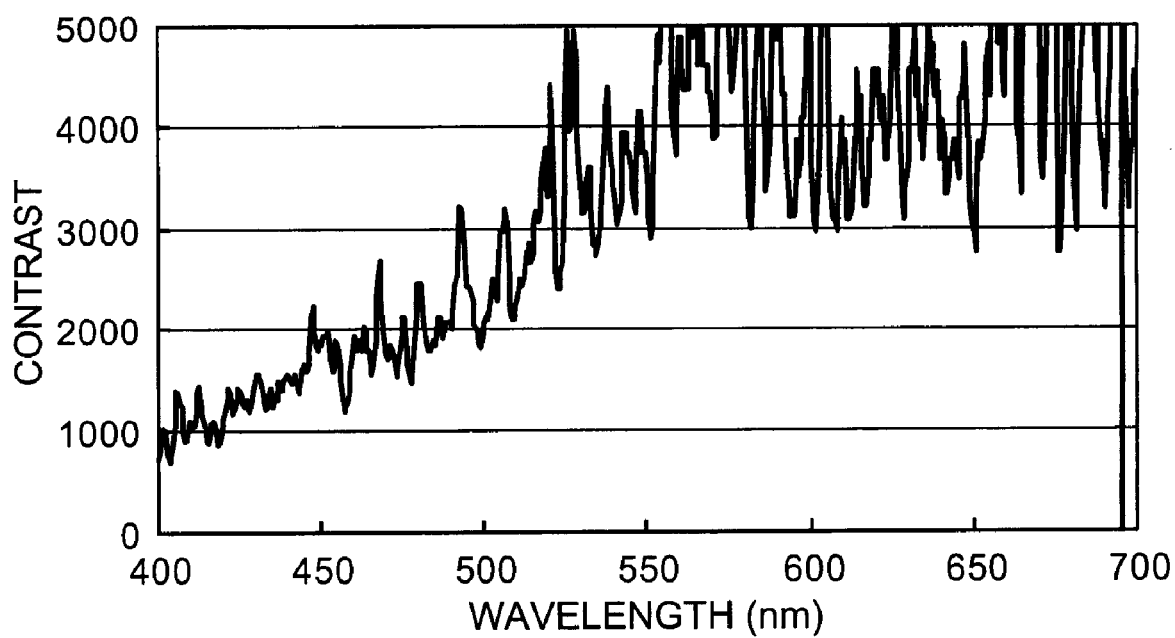

In case of applying the optical element 1 to a transmission type device, the characteristics of transmitted light becomes an important factor. FIGS. 4A and 4B are graphs indicating characteristics of transmitted light in the optical element, where FIG. 4A indicates a wavelength dependence of transmittance and FIG. 4B indicates a wavelength dependence of contrast. Here, the contrast is defined by a ratio of the intensity of the component s to the intensity of the component p (FIG. 3B) of the light transmitting through the optical element 1. As illustrated in the drawing, there is a tradeoff between the transmittance and the contrast. For instance, when the contrast is increased, then the transmittance slightly declines.

The diffusing effects (shown in FIG. 3A) of the reflected light 80r and of the transmitted light 80t are controlled by changing the height g of the steps 8 in the diffractive functional layer 4. If the incident light 80 enters approximately vertically to the diffractive functional layer 4, the highest diffusing effect of the reflected light 80r is provided at a height gr of the steps 8, and the height gr is obtained by the following formula (1).

$$gr=(2m+1)\lambda/4n \qquad \text{Formula (1)}$$

wherein m is an integer greater than or equal to 0, λ is the wavelength of the incident light 80, and n is a refraction index of the surrounding medium of the optical element 1. At the same time, the highest diffusing effect of the transmitted light 80t is provided at a height gt of the steps 8, and the height gt is obtained by the following formula (2).

$$gt=(2m+1)\lambda/2(N-1) \qquad \text{Formula (2)}$$

wherein N is the refraction index of the diffractive functional layer 4.

The formulae (1) and (2) shows that the height gr and the height gt of the steps 8 that respectively provide the largest diffusing effect of the reflected light 80r and of the transmitted light 80t are different. Therefore, the diffusion effect of the transmitted light 80t is suppressed when the height of the steps 8 in the diffractive functional layer 4 is equal to the height gr.

For instance, if λ=600 nm, m=0, n=1.5, and N=1.5, then formula (1) evaluates to gr=100 nm, and formula (2) evaluates to gt=600 nm. Here, if the height g of the steps 8 is 100 nm (the height gr), then the diffusion effect of the reflected light 80r is maximized by the diffractive functional layer 4. At this time, the height g is different from the height gt (600 nm) at which the diffusing effect of the transmitted light 80t becomes the maximum, and therefore the diffusion effect of the transmitted light 80t does not increase. Consequently, the reflected light 80r is diffused in a wide range and the diffusion of the transmitted light 80t is suppressed, while separating the incident light 80 to the reflected light 80r and the transmitted light 80t that have different polarization statuses.

The intermediate value of the gt in formula (2) is expressed as gt', and the gt' satisfies the following formula (3).

$$gt'=(m+1)\lambda/(N-1) \qquad \text{Formula (3)}$$

The diffusion effect of the transmitted light 80t is minimized, if the height g of the steps 8 is set to gt'. In other words, setting the height g of the steps 8 to the above-described height gt' also diffuses the reflected light 80r and suppresses the diffusion of the transmitted light 80t, while separating the incident light 80 to the reflected light 80r and the transmitted light 80t that have different polarization statuses.

In the case of applying the optical element 1 to a specific display device, the first regions 4a and the second regions 4b may be arranged in an entire range totally at random. An alternative arrangement is as follows. A unit pattern is formed, including the plurality of first regions 4a and the plurality of second regions 4b arranged in a specific random distribution, and a plurality of these unit patterns are repetitively arranged. Here, the size of the unit pattern is set arbitrarily. For instance, the unit pattern may be a square, each side being 400 μm. This structure allows a photomask used for manufacturing the diffractive functional layer 4 to have a structure in which each mask pattern equivalent to the above unit pattern is arranged in repetition; thereby making the forming of the photomask as well as the manufacturing of the optical element easier.

Figure 5:
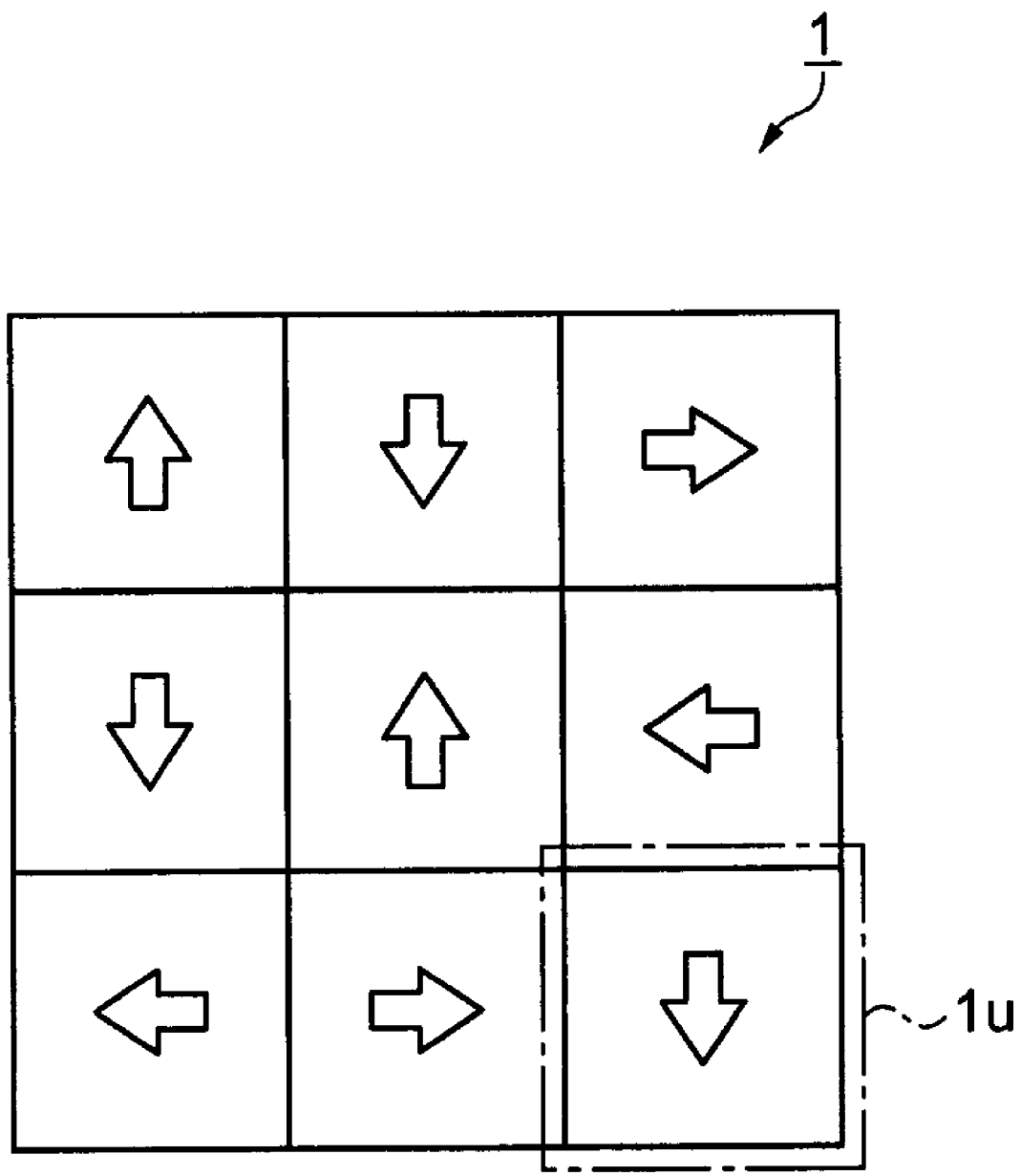
FIG. 5 is a drawing illustrating an example of a unit pattern arrangement of the optical element.

Further, as shown in FIG. 5, the directions of the adjacent unit patterns 1u may be arranged to be different from each other. Referring to FIG. 5, an arrow inside each of the unit patterns 1u indicates the direction of each of the unit patterns 1u. With such an arrangement, the cyclic nature of the diffractive functional layer 4 is reduced. As a result, an inclination in the diffusing direction caused by the cycles of repetition of the unit patterns 1u is resolved, reducing the coloring caused by the diffraction to an extent that does not cause problems in practical use.

As described, in the optical element 1 including the grid 2 and the diffractive functional layer 4, the grid 2 separates the incident light 80 into the reflected light 80r and the transmitted light 80t with different polarization status, and, the diffractive functional layer 4 diffuses the reflected light 80r. In particular, by setting the height g of the steps 8 equal to gr=(2m+1)λ/4n, the reflected light 80r is diffused in a wide range, while reducing the diffusion of the transmitted light 80t. In other words, this embodiment provides the optical element 1 which has both the polarization separation function and the light diffusion function, while reducing the diffusion of only the transmitted light. Moreover, the optical element 1 excels in light resistance, since the polarization separation is carried out by the grid 2 formed of aluminum fine wires.

B. Manufacturing Method of Optical Element

Figure 6:
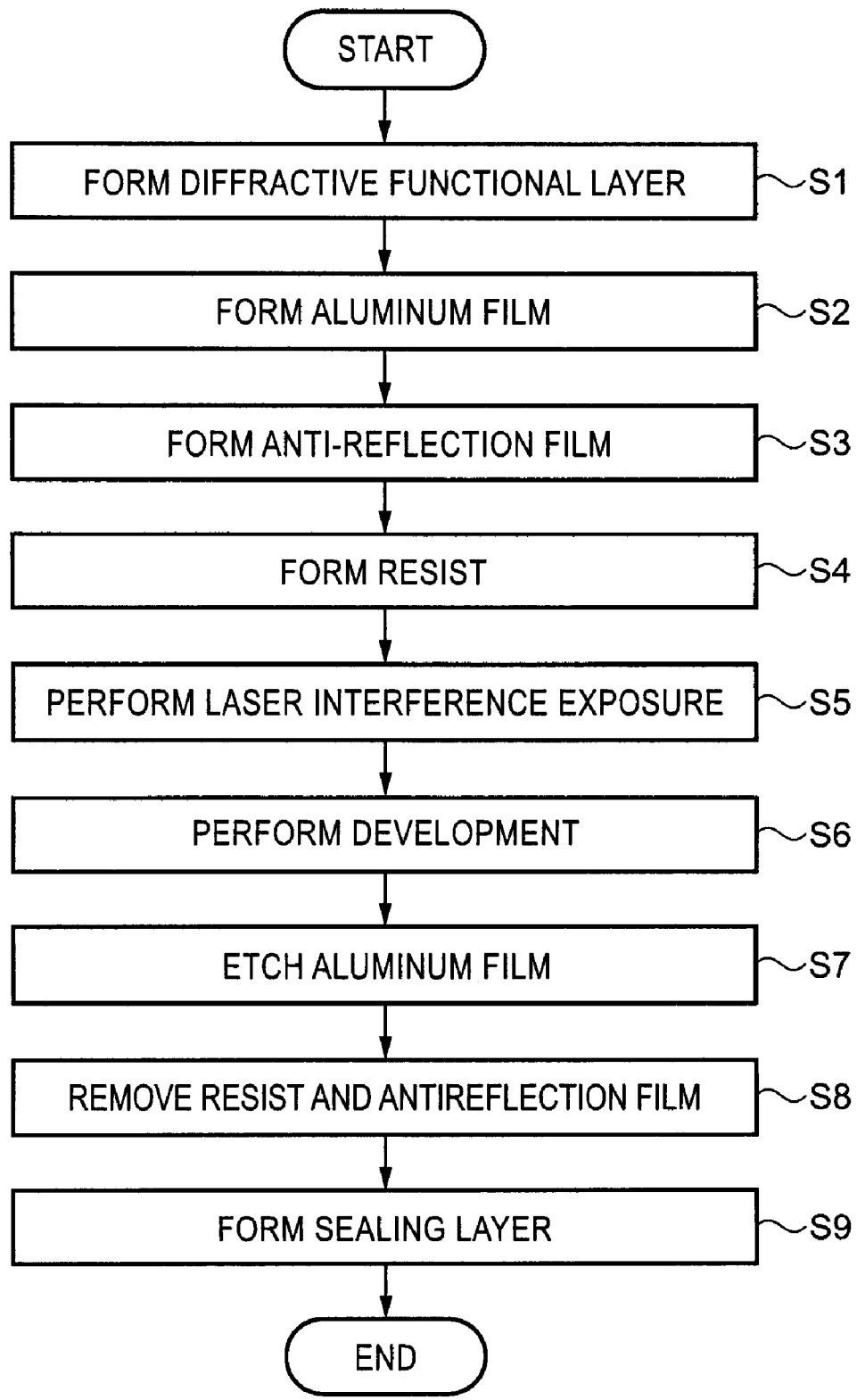
FIG. 6 is a flowchart of a method for manufacturing the optical element.
Figure 7A:
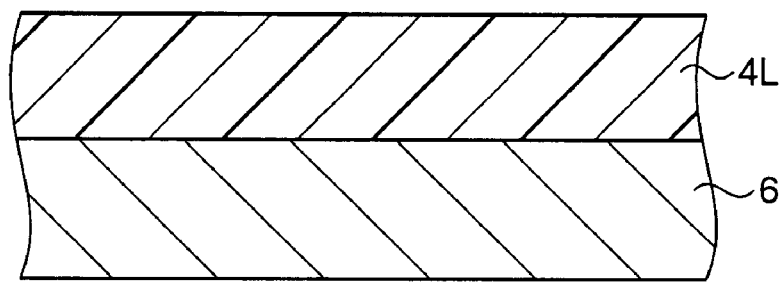
FIGS. 7A to 7C are sectional views of manufacturing processes of the optical element.
Figure 7B:
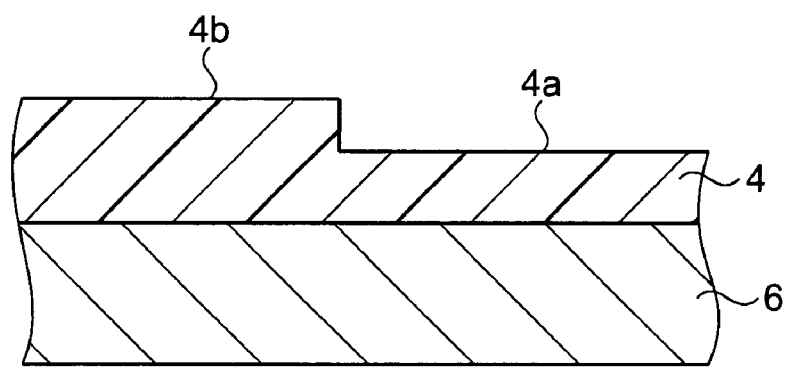

A method for manufacturing the optical element 1 will now be described with reference to FIGS. 6 through 8. FIG. 6 is a flowchart of the method for manufacturing the optical element 1, and FIGS. 7A through 8C are sectional views of manufacturing processes of the optical element 1. The description will now be made along the flowchart of FIG. 6.

In step S1, the diffractive functional layer 4 is formed on the base 6. In this process, a diffractive functional material layer 4L formed of polymer is first deposited on the base 6 formed of glass with a thickness of 0.7 mm, using methods such as spin coating (FIG. 7A). Subsequently, regions that are equivalent to the first regions 4a in the diffractive functional material layer 4L are selectively exposed using a photomask, and those regions are thereafter removed with wet development, so as to form the distributions of the first regions 4a and of the second regions 4b on the first surface of the diffractive functional material layer 4L. The difference of height between the first regions 4a and the second regions 4b, i.e. the depth of portions being etched in the diffractive functional material layer 4L is, for instance, 100 nm. Moreover, this etching is carried out so that the first regions 4a and the second regions 4b become parallel to each other. Consequently, the diffractive functional layer 4 is formed on the base 6 (FIG. 7B).

In step S2, an aluminum film 2L is formed as a conductor film on the diffractive functional layer 4 with a thickness of 120 nm by methods such as sputtering.

Figure 9A:
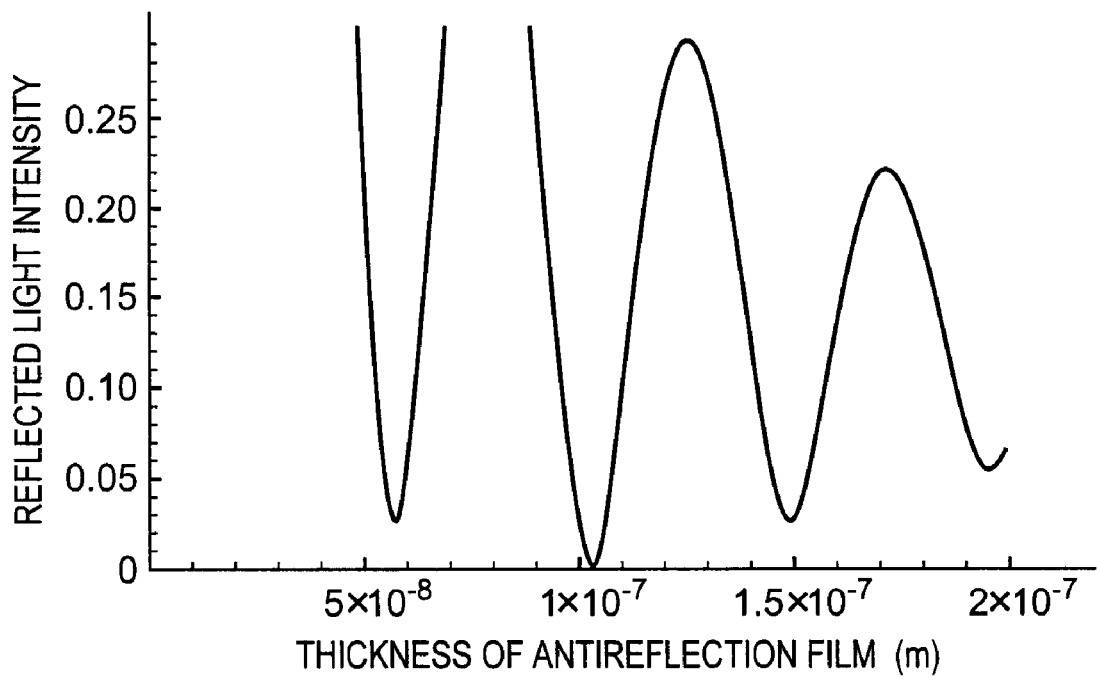
FIGS. 9A and 9B are graphs illustrating a relationship between a thickness of an anti-reflection film and a reflected light intensity at an interface between resist and the anti-reflection film, in the case of depositing the resist on the anti-reflection film.
Figure 9B:
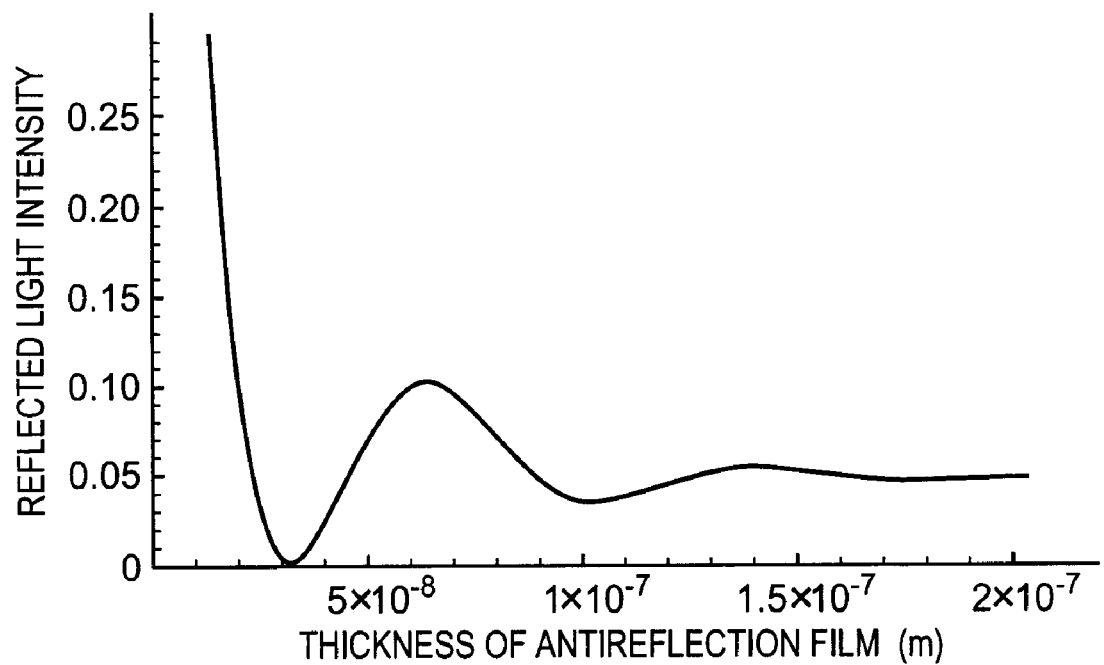

In step S3, an anti-reflection film 32 is formed on the aluminum film 2L with methods such as vacuum deposition and sputtering. SiC and $SiO_xN_y$:H, where x and y represent relative proportions, are suitable as examples of the anti-reflection film 32. Indium tin oxide (ITO) may also be used. Anti-reflective efficiency largely depends on the complex refractive index of materials. It is preferable that the real part of the complex refractive index be, for instance, greater than or equal to 1.4, and the imaginary part of the complex refractive index be between −0.1 and −1.5 inclusive. FIGS. 9A and 9B are graphs illustrating a relationship between a thickness of the anti-reflection film 32 and a reflected light intensity at the interface between a resist 34 and the anti-reflection film 32, when the resist 34 (FIG. 7C) are deposited on the anti-reflection film 32. FIG. 9A exhibits a case in which SiC is used as the anti-reflection film 32, and FIG. 9B exhibits a case in which $SiO_xN_y$:H is used as the anti-reflection film 32. The optimal film thickness of the anti-reflection film 32 varies in accordance with film forming conditions, even if the material being used does not change.

Figure 7C:
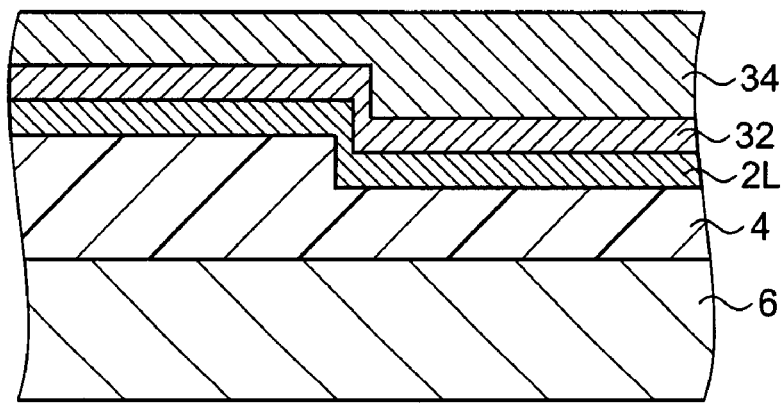

In step S4, the resist 34 which includes an approximately planer surface is formed on the anti-reflection film 32 with methods such as spin coating (FIG. 7C).

Figure 8A:
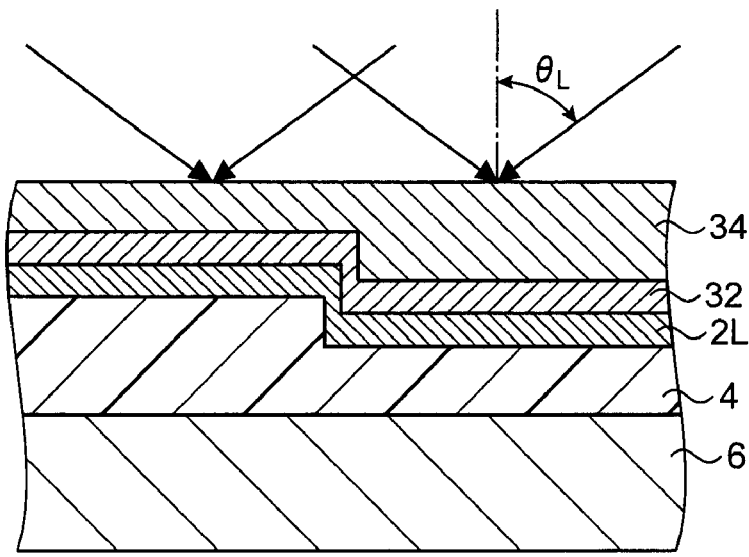
FIGS. 8A to 8C are sectional views of the manufacturing processes of the optical element.

Thereafter, in step S5, a laser interference exposure is carried out on the resist 34, selectively exposing regions equivalent for forming the fine wires of the grid 2 (fine linear regions at a 140 nm pitch), so as to form the latent images of the fine wires (FIG. 8A). A deep ultra violet (DUV) laser in continuous oscillation with a wavelength of 266 nm can be used as a light source of the laser interference exposure, and an angle of incidence θL is, for instance, 72 degrees. At this time, the anti-reflection film 32 formed at the under layer of the resist 34 prevents defects of incomplete exposure caused by the aluminum film 2L reflecting the laser light. Here, since the first regions 4a and the second regions 4b in the diffractive functional layer 4 are parallel to each other, the laser light beams are incident to both regions simultaneously at the same angle. Therefore, the laser light is irradiated evenly with an approximately the same power density onto the diffractive functional layer 4 that has relief patterns, thereby forming the resist 34 and the grid 2 in a high precision with respect to shapes and sizes in the following steps. Moreover, in the resist 34, there is a slight film thickness fluctuation originating from the relief patterns of the diffractive functional layer 4. However, defects related to the shapes of patterns and are originating from the film thickness fluctuation scarcely occurs, since the depth of these concaves and convexes, i.e. the height g of the steps 8, is significantly small, ranging approximately between 100 nm to 200 nm. Therefore, it is possible to form the latent image which is similar to the case of forming the resist on a planer surface.

Figure 8B:
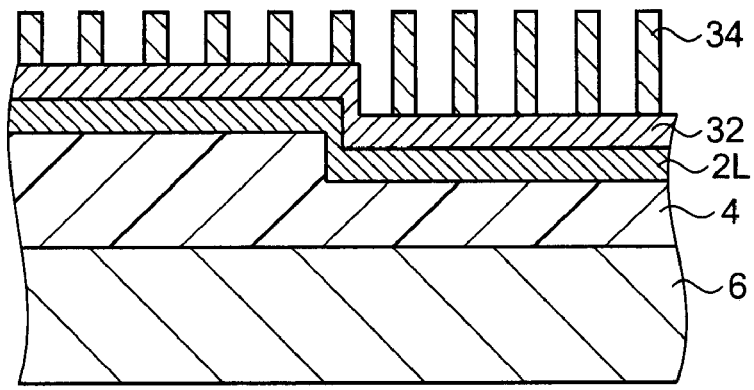
Figure 8C:
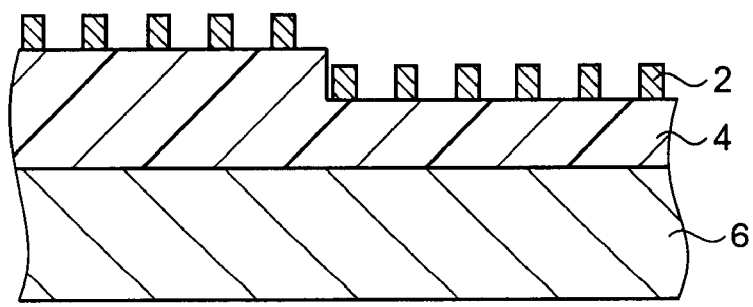

In step S6, the resist 34 that underwent the laser interference exposure is developed. As a result, a fine linear pattern of the resist 34 is obtained at a 140 nm pitch (FIG. 8B).

In step S7, the aluminum film 2L is etched. Specifically, the anti-reflection film 32 and the aluminum film 2L are patterned with dry etching, using the pattern of resist 34 as a mask. In the subsequent step S8, the resist 34 and the anti-reflection film 32 are removed. As a result, the grid 2 formed of fine wires arranged at a 140 nm pitch is formed on the diffractive functional layer 4 (FIG. 8C).

A $SiO_2$ with a thickness of 30 nm formed between the aluminum film 2L and the anti-reflection film 32 improves the etching rate of the anti-reflection film 32 to the aluminum film 2L, compared to the case of resist 34. Therefore, the pattern of the resist 34 can be made shallow. This allows the forming of the resist 34 pattern with higher stability.

In step S9, a sealing layer 3 is formed on the grid 2. This process is carried out by forming a layer formed of materials such as $SiO_2$ or SiN on the grid 2 under the vacuumed environment, with methods such as chemical vapor deposition (CVD) and vacuum deposition. As a result, spaces surrounded with the diffractive functional layer 4, the grid 2, and the sealing layer 3 are sealed in vacuumed status (FIG. 2B).

The optical element 1 having the diffractive functional layer 4 and the grid 2 is thereby manufactured by the steps described above. In this manufacturing method, the forming of the grid 2 on the surface of the diffractive functional layer 4 is more securely assured, since the relief patterns on the surface of the diffractive functional layer 4 are rectangular. In this embodiment, while the aluminum film 2L is used as a conductor film, other metal materials such as silver and nickel may also be used. Moreover, while the polymer is used as a material for the diffractive functional layer 4, the grid 2 may also be formed, with the manufacturing method described above, on the diffractive functional layer 4 formed on a quartz glass substrate with photolithography. Here, the photolithography is carried out, including processes such as: coating resist on the diffractive functional material layer 4L; exposing and thereafter developing the resist through a photomask; etching the diffractive functional material layer 4L using the remaining resist as a mask; and removing the resist.

C. Projection Display Device

Figure 21:
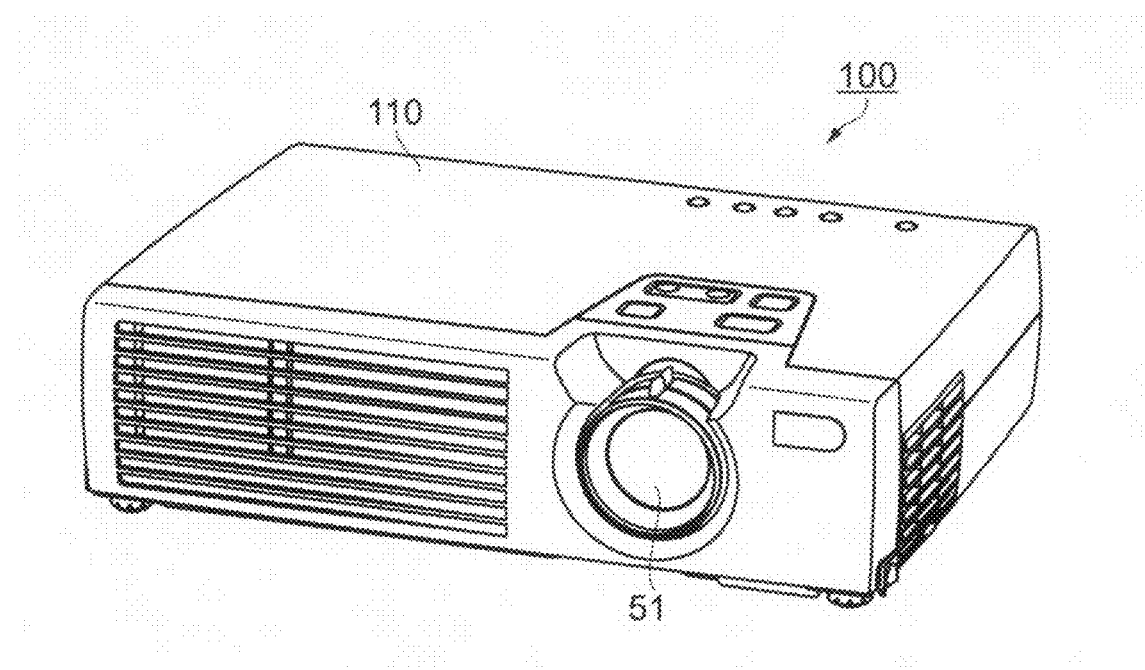
FIG. 21 is a perspective view of a projector as a projection display device.
Figure 22:
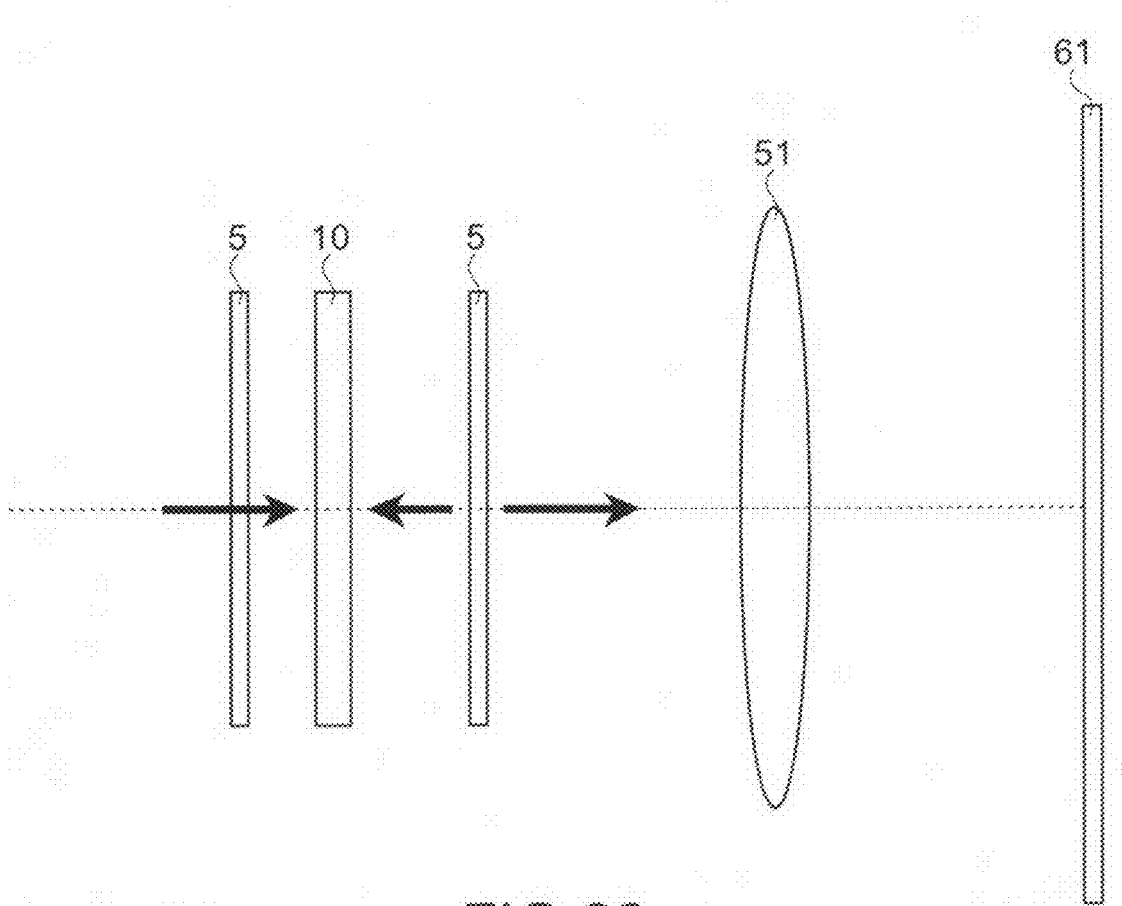
FIG. 22 is a schematic drawing illustrating an example of a configuration of a projection display device using the wire-grid polarizer.

Examples of applying the optical element 1 to a projection display device will now be described. FIG. 21 is a perspective view of a projector 100 as a projection display device. The projector 100 includes a case 110 and a projection lens 51. In this device, light is emitted from an un-illustrated built-in light source such as a mercury lamp, and the light is projected forward from the projection lens 51 after the light is modulated by the liquid crystal device 10 (FIG. 10) which serves as an internally provided light valve.

Figure 10:
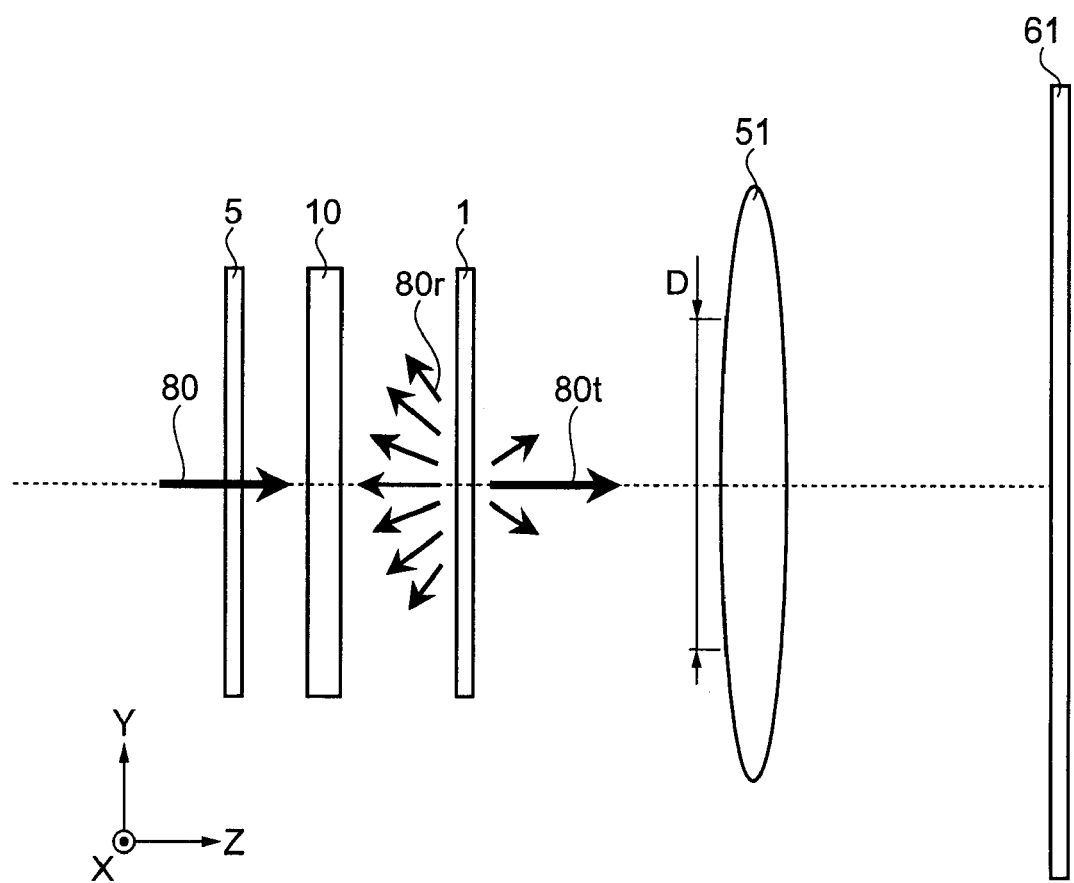
FIG. 10 is a schematic drawing illustrating an optical system of a projector.

FIG. 10 is a schematic drawing illustrating an optical system of the projector 100. The dotted line in the drawing indicates an optical path of light emitted from the light source in the projector 100. The wire-grid polarizer 5, the liquid crystal device 10, the optical element 1, and the projection lens 51 are arranged in this order in the optical path. In other words, the optical element 1 is arranged on the optical path anywhere between the liquid crystal device 10 and the projection lens 51. The screen 61 is arranged ahead of the projection lens 51 in the optical path. The projector 100 magnifies and projects, on the screen 61, what is displayed by the liquid crystal device 10 through the projection lens 51.

The wire-grid polarizer 5 includes multiple fine wires formed of a conductor, arranged in parallel on a transparent base. The wire-grid polarizer 5 reflects a component of the incident light 80, the component having a polarization axis parallel to the fine wires, while transmitting another component which has a polarization axis orthogonal to the fine wires. In other words, the wire-grid polarizer 5 has the polarization separation function. However, this wire-grid polarizer 5 is an element in which the fine wires are simply formed on a planer base, and therefore do not have a function to diffuse the reflected light and the transmitted light. The component of the incident light 80 transmitting through the wire-grid polarizer 5 enters the liquid crystal device 10 almost without any diffusion.

The liquid crystal device 10 includes an element substrate and a counter substrate that are adhered together through a sealing layer shaped as a frame, and liquid crystal is sealed in between the element substrate and the counter substrate. The orientation status of this liquid crystal is changed by a drive voltage impressed thereto through electrodes formed on counter surfaces of the element substrate as well as of the counter substrate. The liquid crystal device 10 changes the polarization status of the transmitted light, in accordance with the orientation status of the liquid crystal.

Figure 11:
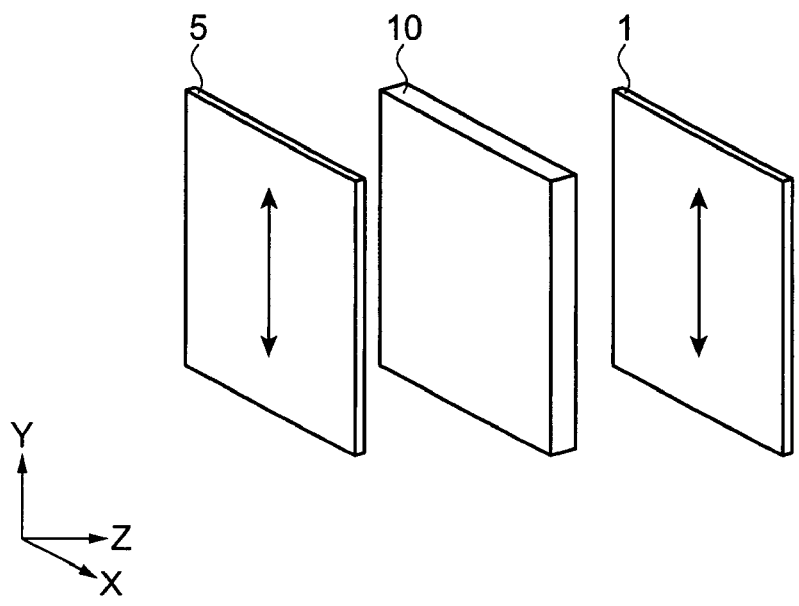
FIG. 11 is a drawing illustrating an example of a configuration of a transmission axis of the optical element and a wire-grid polarizer.

The light transmitted through the liquid crystal device 10 enters the optical element 1. As described, the optical element 1 transmits the component that has the polarization axis orthogonal to the fine wires of the grid 2 so as to let the component enter the projection lens 51, and, reflects the component that has the polarization axis parallel to the fine wires of the grid 2. It is preferable that the optical element 1 be arranged as far away from the liquid crystal device 10 as possible, in order to reduce defects of the liquid crystal device 10 originating from the reflected light 80r. FIG. 11 illustrates one example of configuring the transmission axes in the optical element 1 and in the wire-grid polarizer 5. In this embodiment, the transmission axes of the optical element 1 and of the wire-grid polarizer 5 are parallel to each other.

Here, in the diffractive functional layer 4 of the optical element 1, the height g of the steps 8 is equal to $gr=(2m+1)\lambda/4n$. As a result, the diffraction effect of the diffractive functional layer 4 provides the highest diffusion effect of the reflected light 80r, while the diffusion of the transmitted light 80t is reduced.

Figure 12A:
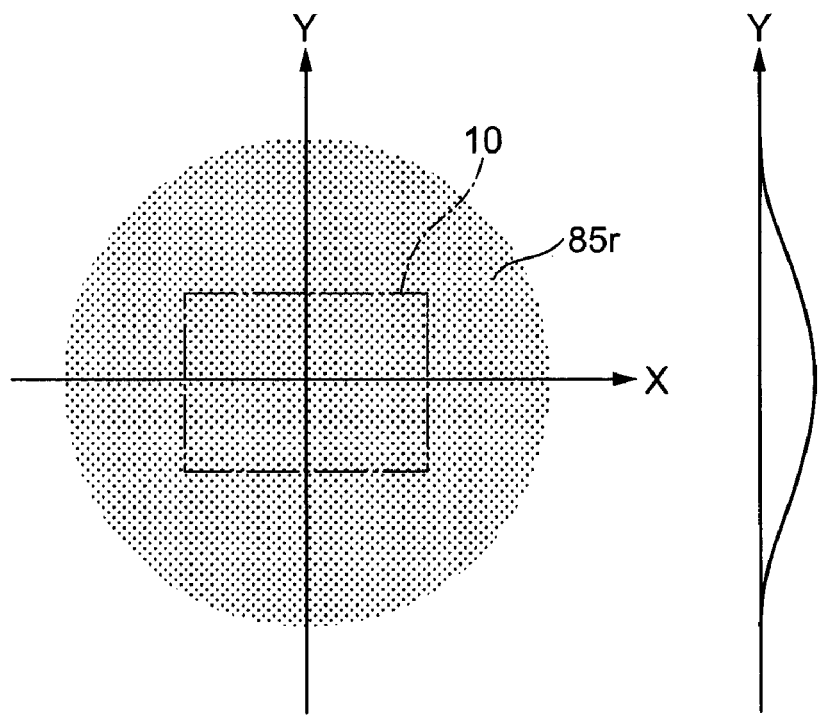
FIGS. 12A and 12B are drawings illustrating a diffractive light intensity distribution provided by the optical element.
Figure 12B:
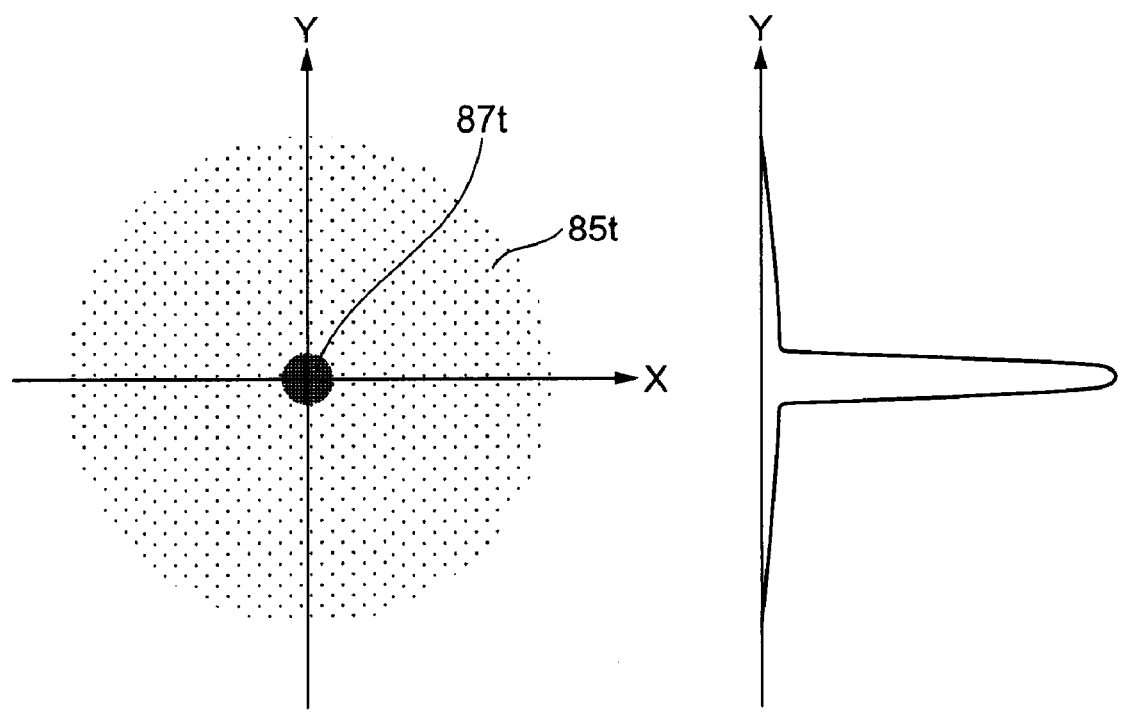

FIGS. 12A and 12B are drawings illustrating a diffractive light intensity distribution originating from the optical element 1. FIG. 12A indicates the intensity distribution of the reflected light 80r from the optical element 1 at the side of the liquid crystal device 10, and FIG. 12B indicates the intensity distribution of the transmitted light 80t at a side across the optical element 1 which is the plane of symmetry with respect to liquid crystal device 10. The left parts of FIGS. 12A and 12B indicate the diffractive light intensity distribution at a X-Y plane. The darker the color is, the stronger the light intensity. The right parts of FIGS. 12A and 12B indicate the diffractive light intensity distribution at the position of the Y-axis.

A region 85r in the left part of FIG. 12A is a region irradiated by the reflected light 80r. The region 85r is an approximately circular region at least as large as the entire region in which the liquid crystal device 10 is arranged, and the reflected light 80r is diffused to the entire region 85r. Since the reflected light 80r from the optical element 1 is diffused to the region 85r enclosing the liquid crystal device 10, defects such as malfunctions originating from the reflected light 80r concentrating on part of the liquid crystal device 10 are less likely to occur.

A region 85t in the left part of FIG. 12B is a region in which the transmitted light 80t is irradiated. However, as shown in the right part of FIG. 12B, the light intensity in the region 85t is significantly small compared to that of in the region 85r. On the other hand, in a region 87t in the left part of FIG. 12B, the intensity of the transmitted light 80t is high. As described, the transmitted light 80t from the optical element 1 is concentrated in the vicinity of the point of origin in the X-Y coordinate plane (i.e. a vicinity of the optical path), and scarcely diffuses to other directions. This is attributed to the factor that the diffusion effect of the transmitted light 80t does not increase, since the height g of the steps 8 in the diffractive functional layer 4 is the height $gr=(2m+1)\lambda/4n$ which maximizes the diffusion effect of the reflected light 80r. Consequently, a significant part of the transmitted light 80t from the optical element 1 enters an entrance pupil D (FIG. 10) of the projection lens 51, thereby improving the light use efficiency.

Specific examples of ranges of the diffractive light distribution originating from the optical element 1 will now be described. If the range of the diffractive light distribution is called "S", then the range S of this distribution is determined by the minimum size δ (FIG. 2A) of the first regions 4a and the second regions 4b in the diffractive functional layer 4 included in the optical element 1, as well as by a distance L from the diffractive functional layer 4. The relationship between the minimum size δ and the distance L is expressed as $S=2\lambda L/\delta$. If the distance between the diffractive functional layer 4 and the liquid crystal device 10 is "L1", then a range Sr of the reflected light 80r at which the liquid crystal device 10 is positioned is given by $Sr=2\lambda L1/\delta$. If the distance between the diffractive functional layer 4 and the entrance pupil D of the projection lens 51 is "L2", then a range St of the transmitted light 80t at the entrance pupil D of the projection lens 51 is given by $St=2\lambda L2/\delta$. For instance, if λ=600 nm, δ=2.0 μm, L1=40 mm, and L2=50 mm, then Sr=24 mm, and St=30 mm. In the case of the liquid crystal device 10 with, for instance, a diagonal diameter of 0.9 inch (approx. 23 mm), it is possible to diffuse the reflected light 80r to the region 85r (FIG. 12A) that encloses the entire liquid crystal device 10. This weakens the intensity of light irradiated on the liquid crystal device 10 to a level that enables a stable operation thereof. On the other hand, even if the transmitted light 80t diffuses in a range of St=30 mm, the diffusion effect is sufficiently reduced as shown in FIG. 12B, and the transmitted light 80t concentrates in the vicinity of the optical path. Therefore, approximately the entire portion of the light beam enters the entrance pupil D of the projection lens 51.

As described, in the projector 100 in which the optical element 1 is applied, the diffractive functional layer 4 causes the reflected light 80r to diffuse widely and thereafter reach the liquid crystal device 10. Therefore, the stable operation of the liquid crystal device 10 is not disturbed. Moreover, the diffusion of the transmitted light 80t is sufficiently suppressed, and a quantity of light reaching the screen 61 is therefore merely sacrificed. Consequently, the bright, long-lasting projector 100 is realized.

First Modification

As described above, according to the optical element 1, the diffractive functional layer 4 provides the reflected light 80r with an appropriate intensity distribution and range. Here, a spatial intensity distribution of the reflected light 80r is controlled in accordance with the shape or the size of the liquid crystal device 10, by improving either an order of an alignment of the concaves and convexes of the diffractive functional layer 4 (i.e. the arrangement of the first regions 4a and the second regions 4b) or a planer shape thereof. In other words, the reflected light 80r can be collected to a specific location.

Figure 13:
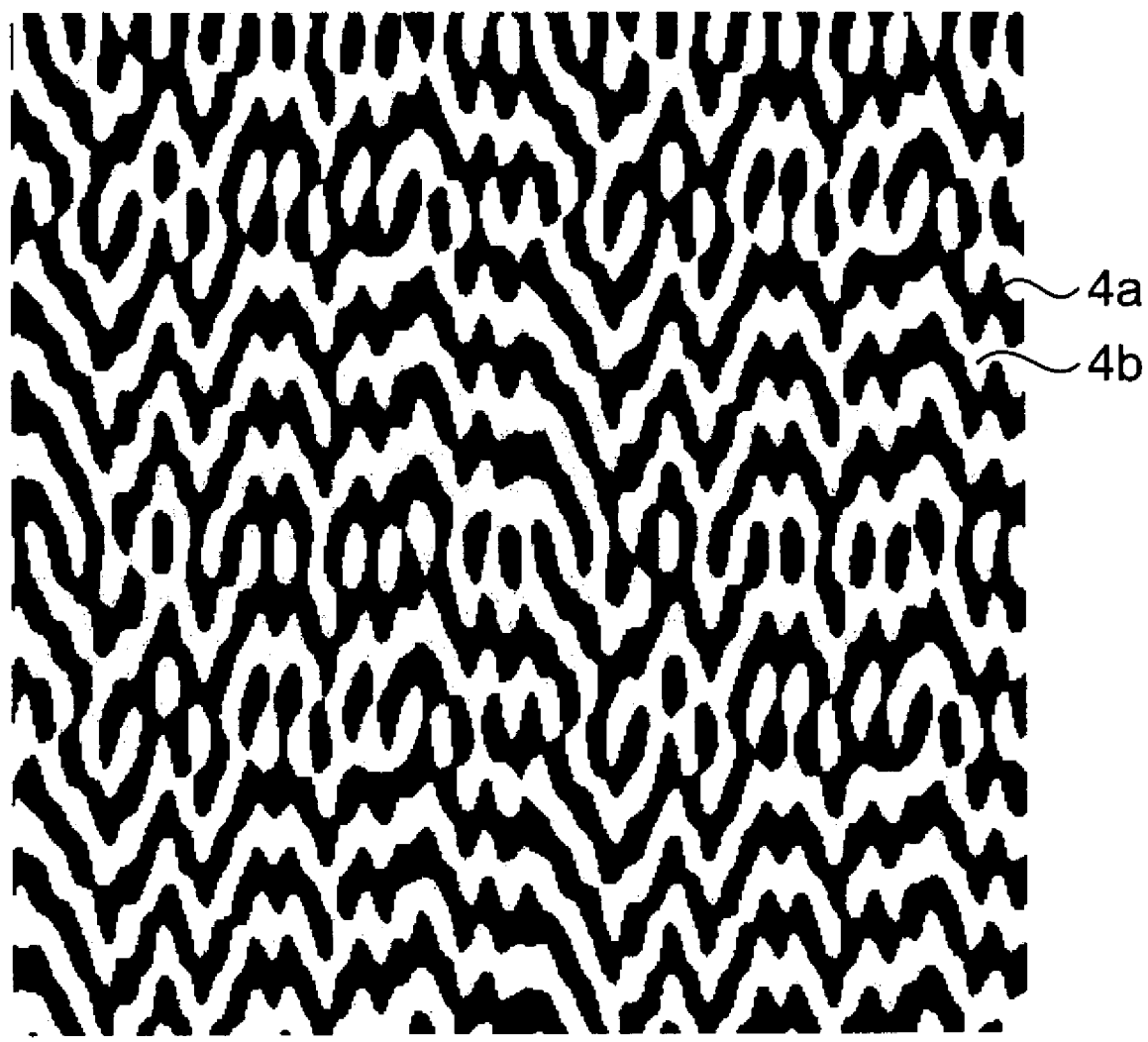
FIG. 13 is a drawing illustrating an example of a pattern including a first region and a second region in the diffractive functional layer.

For instance, the shapes of the first regions 4a and the second regions 4b in the diffractive functional layer 4 are not limited to the ones illustrated in FIGS. 1A, 1B, and 3A, but may also include the shape illustrated in FIG. 13. Referring to FIG. 13, the black regions are equivalent to the first regions 4a, and the white regions are equivalent to the second regions 4b.

Figure 14A:
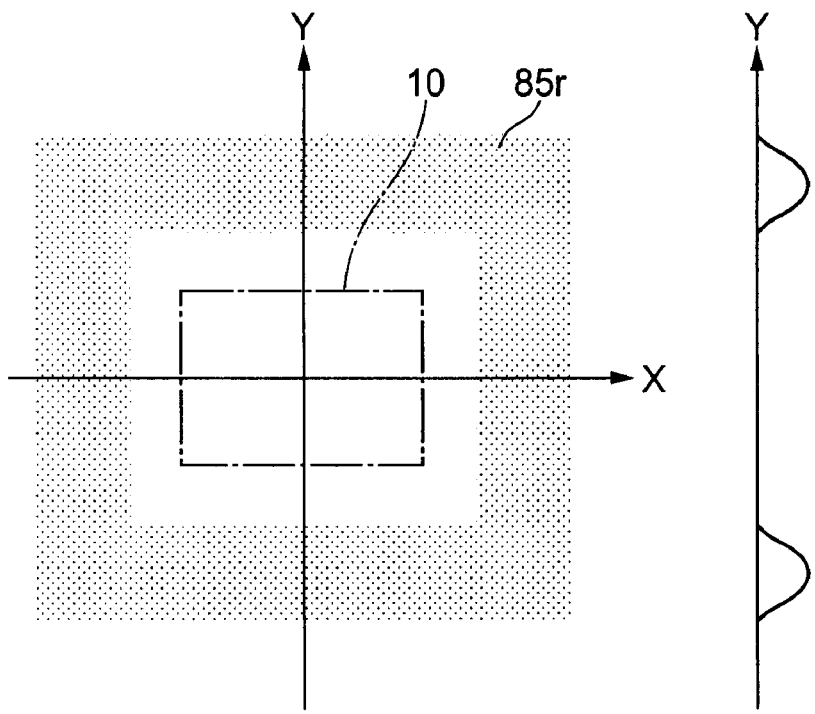
FIG. 14 is a drawing illustrating the diffractive light intensity distribution originating from the optical element having a pattern shown in FIG. 13.
Figure 14B:
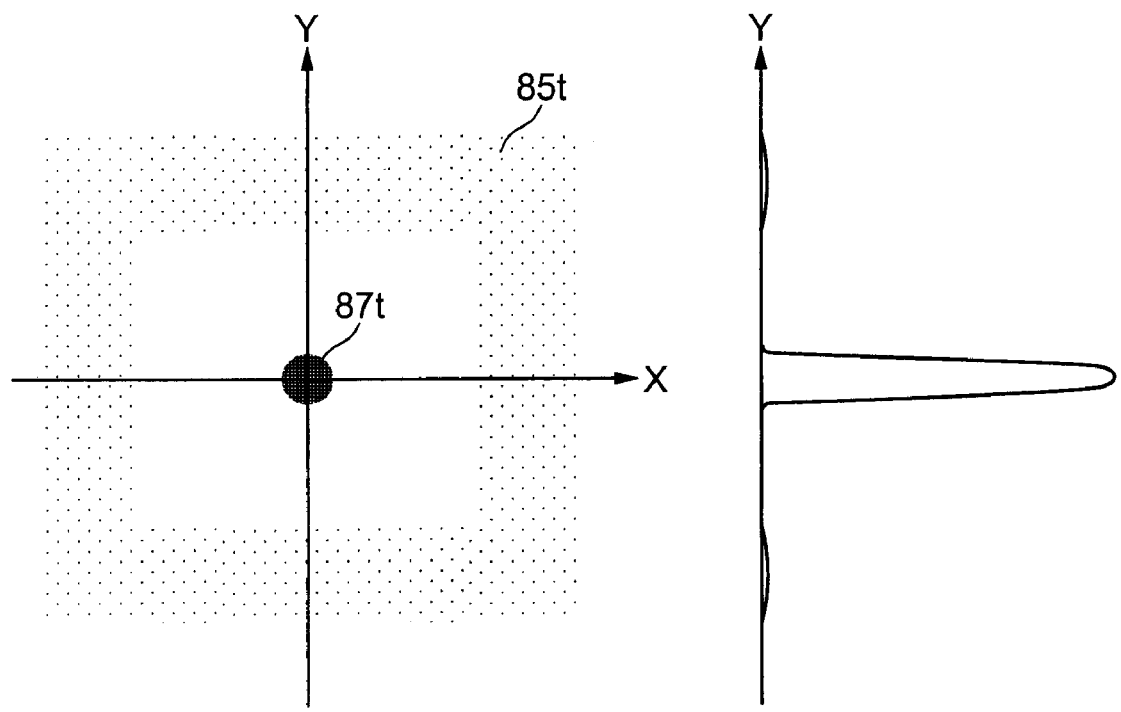

FIGS. 14A and 14B illustrate the diffractive light intensity distribution originating from the optical element 1 that has the pattern shown in FIG. 13. Similar to FIGS. 12A and 12B described above, the FIGS. 14A and 14B respectively indicate the intensity distribution of the reflected light 80r and the transmitted light 80t. In this modification, the region 85r in which the reflected light 80r is diffracted becomes a region with a shape of a frame surrounding the liquid crystal device 10, as shown in FIG. 14A. As described, the diffusion of the reflected light 80r in this modification is mostly restricted within a region that does not include the location where the liquid crystal device 10 is arranged, and hardly enters into the liquid crystal device 10.

At the same time, as shown in FIG. 14B, the transmitted light 80t enters the region 85t that has, similar to the region 85r, a shape of a frame, as well as to the region 87t which is in the vicinity of the point of origin. Here, as shown in the right part of FIG. 14B, a significant portion of the transmitted light 80t enters the region 87t, and the light entering into the region 85t with a shape of a frame is only a fraction of the remaining portion of the transmitted light 80t. As described, the transmitted light 80t from the optical element 1 is concentrated in the vicinity of the point of origin in the X-Y coordinate plane (i.e. a vicinity of the optical path), and scarcely diffuses to other directions. This is attributed to the factor that the diffusion effect of the transmitted light 80t does not increase, since the height g of the steps 8 in the diffractive functional layer 4 is the height $gr=(2m+1)\lambda/4n$ which maximizes the diffusion effect of the reflected light 80r. The FIGS. 14A and 14B exhibit a case in which an incident light is a monochromatic light, and if the incident light has a constant wavelength range, the borders of the region 85r, the region 85t, and the region 87t become blurred, widening the width of each region.

As described, in the optical element 1 that includes the diffractive functional layer 4 having the pattern shown in FIG. 13, a significant portion of the reflected light 80r originating from the optical element 1 is diffused to a region outside of where the liquid crystal device 10 is arranged. Therefore, the projector 100 which uses high luminance light reduces optical malfunctions and deteriorations of the liquid crystal device 10 caused by the reflected light 80r.

Figure 15A:
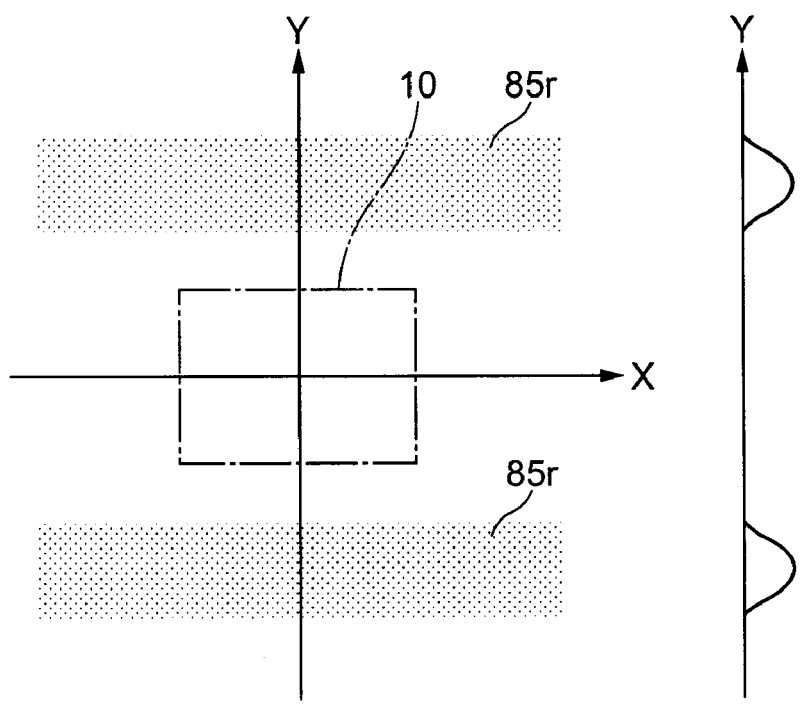
FIG. 15 is a drawing illustrating the diffractive light intensity distribution originating from the optical element according to a modification.
Figure 15B:
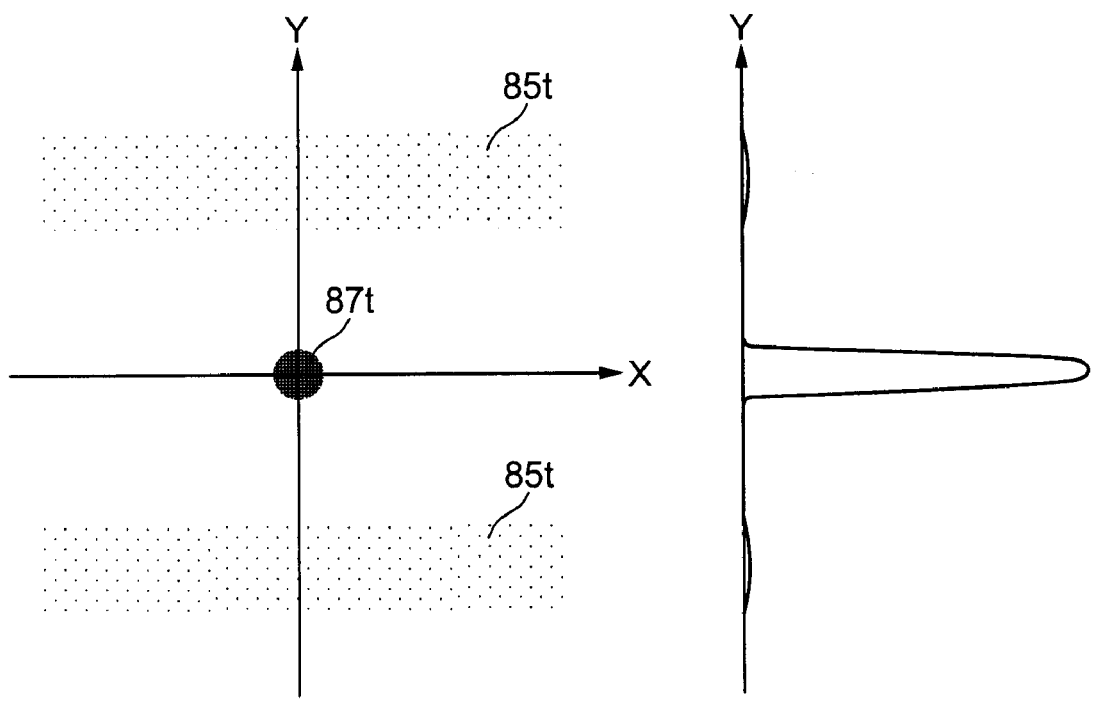

Similarly, adjusting the arrangement pattern of the first regions 4a and the second regions 4b of the diffractive functional layer 4 allows the diffractive intensity distribution as shown in FIGS. 15A and 15B. FIGS. 15A and 15B respectively indicate the intensity distribution of the reflected light 80r and of the transmitted light 80t. In this example, each region 85r in which the reflected light 80r is diffused is distributed above and below the liquid crystal device 10 (FIG. 15A). Moreover, a significant portion of the transmitted light 80t is concentrated in the region 87t which is in the vicinity of the optical axis, and a fraction of the remaining portion of light is diffused in each region 85t that has similar configuration as that of the region 85r. This case also allows diffusing the significant portion of the reflected light 80r reflected by the optical element 1 to a region outside of where the liquid crystal device 10 is arranged. Therefore, it is possible to reduce optical malfunctions and deteriorations of the liquid crystal device 10 caused by the reflected light 80r.

Second Modification

Figure 16:
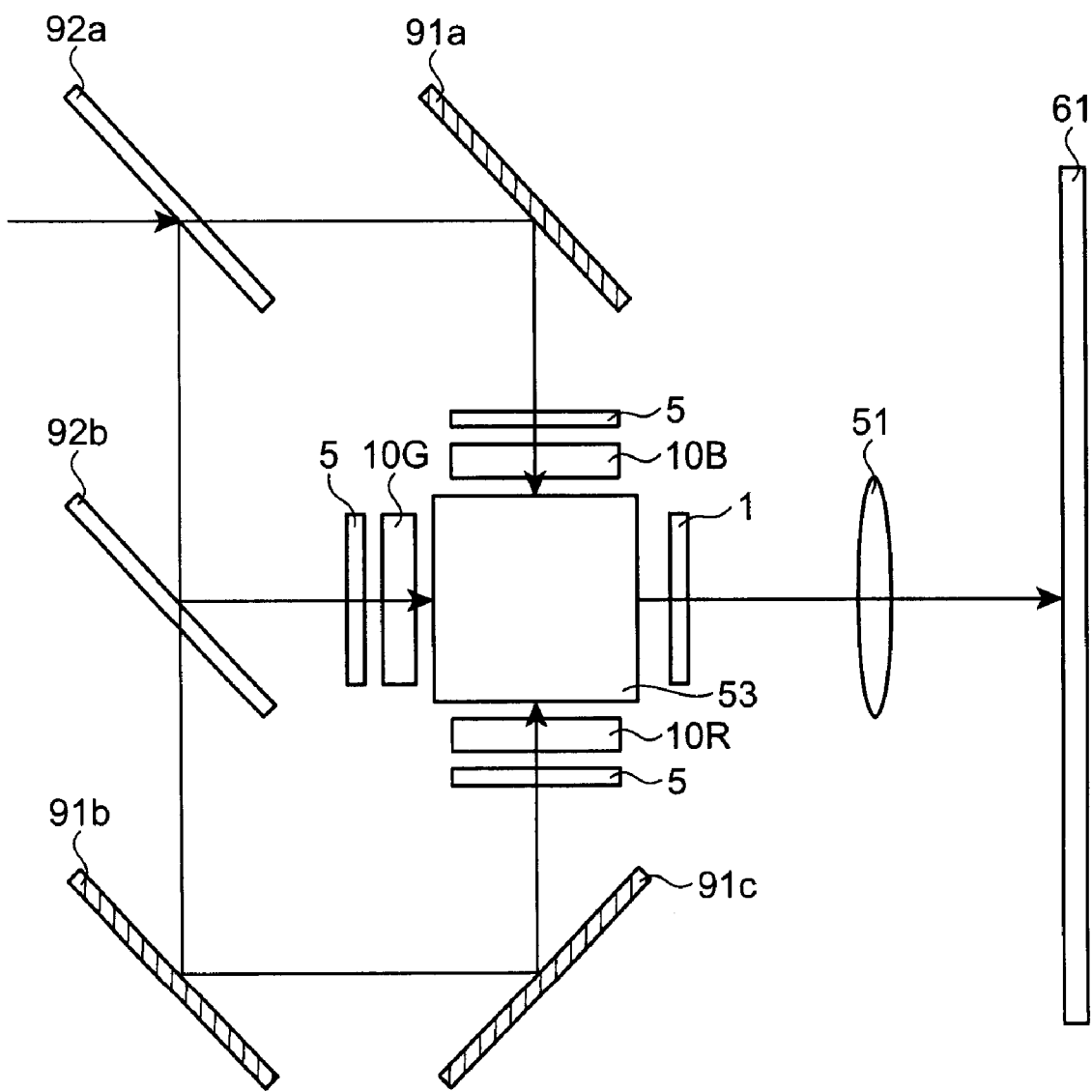
FIG. 16 is a schematic drawing illustrating an optical system of a projector provided with three liquid crystal devices.

The projector 100 may have a structure in which a plurality of liquid crystal devices 10 is used. FIG. 16 is a schematic drawing illustrating an optical system of the projector 100 provided with three liquid crystal devices 10. This optical system includes a prism 53 provided with four planes, the optical element 1 arranged to face one of the planes of the prism 53, and the liquid crystal devices 10R, 10G, and 10B arranged so as to respectively face the other three planes of the prism 53. The prism 53 refracts light beams entering from the liquid crystal devices 10R, 10G, and 10B, and enters the light beams into the optical element 1. That is to say, the prism 53 is arranged in the optical paths reaching the optical element 1 from each of the liquid crystal devices 10R, 10G, and 10B. The liquid crystal devices 10R, 10G, and 10B respectively modulate the intensity of red, green, and blue light beams. Display light is obtained by synthesizing the intensity-modulated light beams with the prism 53. The wire-grid polarizer 5 is arranged at each of the liquid crystal devices 10R, 10G, and 10B, on a side opposite from the prism 53. The optical system described above further includes: the projection lens 51 into which the light emitted from the optical element 1 enters; mirrors 91a, 91b, and 91c; and dichroic mirrors 92a and 92b. The projection lens 51 is arranged on a line extended from the optical path between the prism 53 and the optical element 1.

Light emitted from an-illustrated light source enters the dichroic mirror 92a, transmitting only the blue light. This blue light is transmitted, after being reflected by the mirror 91a, through the wire-grid polarizer 5 and thereafter the liquid crystal device 10B. The remaining portion of light reflected by the dichroic mirror 92a enters the dichroic mirror 92b, reflecting green light and transmitting red light. This green light is transmitted through the wire-grid polarizer 5 and thereafter the liquid crystal device 10G. The red light is transmitted, after being reflected by the mirrors 91b and 91c, through the wire-grid polarizer 5 and thereafter the liquid crystal device 10R. The red, green, and blue light beams transmitted through the liquid crystal devices 10R, 10G, and 10B enter the prism 53, modify their courses, and emit toward the optical element 1.

As described, the optical element 1 transmits the incident light component that has the polarization axis orthogonal to the fine wires of the grid 2 so as to let the component enter the projection lens 51, and, reflects the component that has the polarization axis parallel to the fine wires of the grid 2. At this time, the diffractive functional layer 4 works such that the reflected light reaches, in a widely diffused state, the prism 53 and thereafter the liquid crystal devices 10R, 10G, and 10B. Therefore, stable operations of the liquid crystal devices 10R, 10G, and 10B are not disturbed. Moreover, the diffusion of the transmitted light is sufficiently suppressed, and a quantity of light reaching the screen 61 is merely sacrificed. Consequently, the bright, long-lasting projector 100 is realized.

Figure 17:
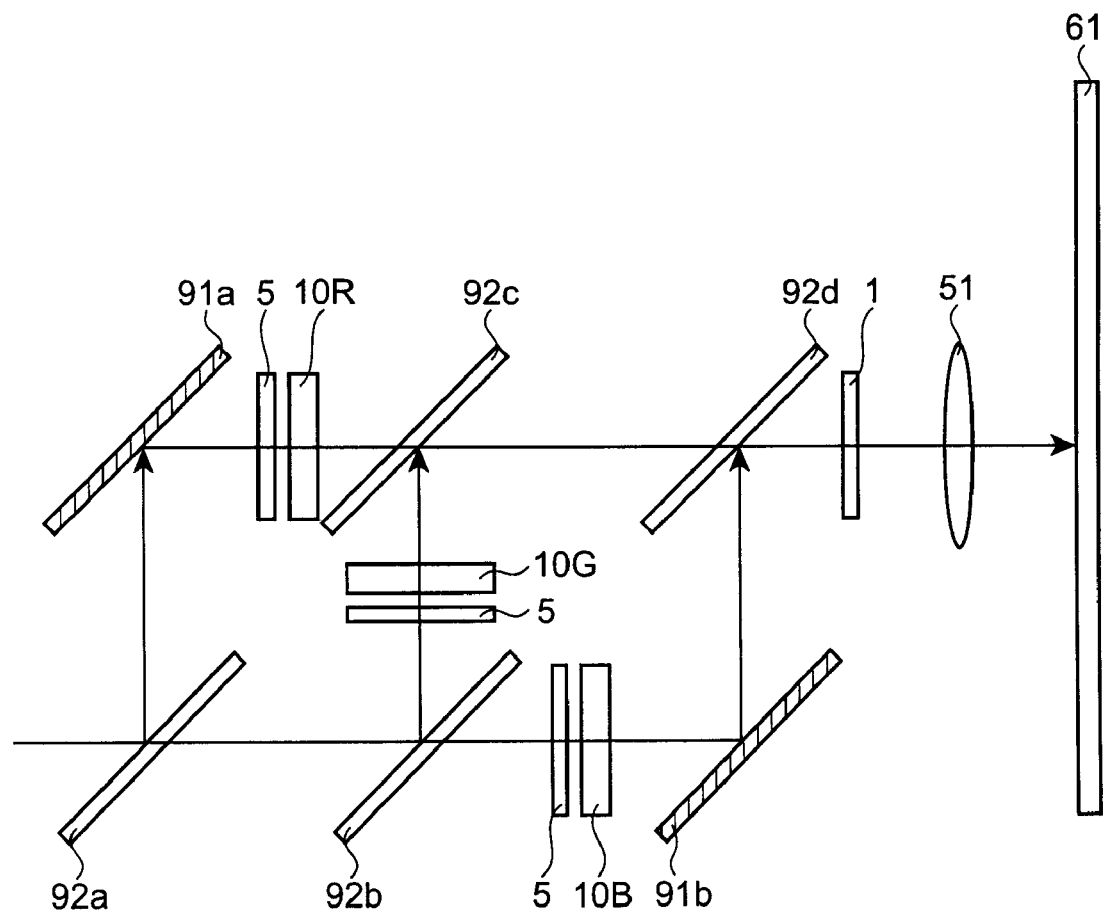
FIG. 17 is a schematic drawing illustrating an optical system of a projector according to a modification.

The projector 100 may also have a structure as illustrated in FIG. 17. In this optical system, a row of mirrors including the dichroic mirrors 92a and 92b as well as the mirror 91b arranged in parallel to each other is facing another row of mirrors including the mirror 91a and the dichroic mirrors 92c and 92d arranged in parallel to each other. Moreover, the wire-grid polarizer 5 and the liquid crystal device 10R are interposed between the mirror 91a and the dichroic mirror 92c; another wire-grid polarizer 5 and the liquid crystal device 10G are interposed between the dichroic mirror 92b and the dichroic mirror 92c; and another wire-grid polarizer 5 and the liquid crystal device 10B are interposed between the dichroic mirror 92b and the mirror 91b. The mirrors 91a and 91b, as well as the dichroic mirrors 92a, 92b, 92c, and 92d are arranged at an angle of 45 degrees with respect to the liquid crystal devices 10R, 10G, and 10B. The optical element 1 and the projection lens 51 are arranged in this order on the line extending out from the alignment of the dichroic mirrors 92c and 92d, and the screen 61 is placed ahead of the projection lens 51 in the optical path.

Light emitted from an-illustrated light source enters the dichroic mirror 92a, reflecting only the red light. This red light is transmitted, after being reflected by the mirror 91a, through the wire-grid polarizer 5, the liquid crystal device 10R, and the dichroic mirrors 92c and 92d in that order, and thereafter enters the optical element 1. The remaining portion of light transmitted through the dichroic mirror 92a enters the dichroic mirror 92b, reflecting green light and transmitting blue light. The green light reflected by the dichroic mirror 92b is transmitted through the wire-grid polarizer 5 and then through the liquid crystal device 10G, subsequently being reflected by the dichroic mirror 92c, so as to be transmitted through the dichroic mirror 92d, and thereafter enters the optical element 1. The blue light transmitted through the dichroic mirror 92b is transmitted through the wire-grid polarizer 5 and then through the liquid crystal device 10B, subsequently being reflected by the mirror 91b, so as to be reflected again by the dichroic mirror 92d, and thereafter enters the optical element 1. Consequently, all of the intensity-modulated red, green and blue light beams transmitted through the liquid crystal devices 10R, 10G, and 10B eventually enter the optical element 1.

As described, the reflected light from the optical element 1 is widely diffused by the effect of the diffractive functional layer 4. Therefore, defects of the reflected light disturbing the stable operations of the liquid crystal devices 10R, 10G, and 10B are less likely to occur. Moreover, the diffusion of the light transmitted through the optical element 1 is sufficiently suppressed, and thus a quantity of light reaching the screen 61 merely sacrificed. Consequently, the bright, long-lasting projector 100 is realized.

Third Modification

Figure 18:
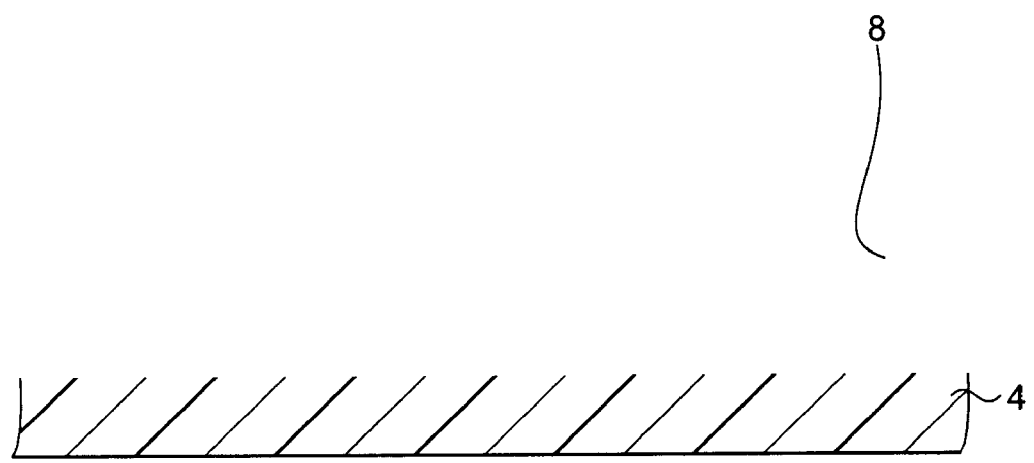
FIG. 18 is a sectional drawing illustrating a state in which a SiN layer is deposited on the optical device.

A substance with a refraction index larger than 1 may be deposited on the side of the grid 2 in the optical element 1. FIG. 18 is a sectional drawing illustrating a state in which a SiN layer is deposited on the optical device 1. Illustration of the sealing layer 3 (FIG. 1B) is omitted in FIG. 18.

When controlling the diffusion effect of the optical element 1, the optimal value of the height g of the steps 8 in the diffractive functional layer 4 depends on a refraction index n of the surrounding media, as explained in formula (1). For instance, if SiN (n≈1.5) is used as the surrounding media as illustrated in FIG. 18, the height g is reduced compared to the case of the surrounding media such as air (n≈1.0). The smaller the height g of the steps 8, the manufacturing processes of the grid 2 including photolithography become easier, allowing the easier manufacturing of the grid 2.

Forth Modification

Figure 19:
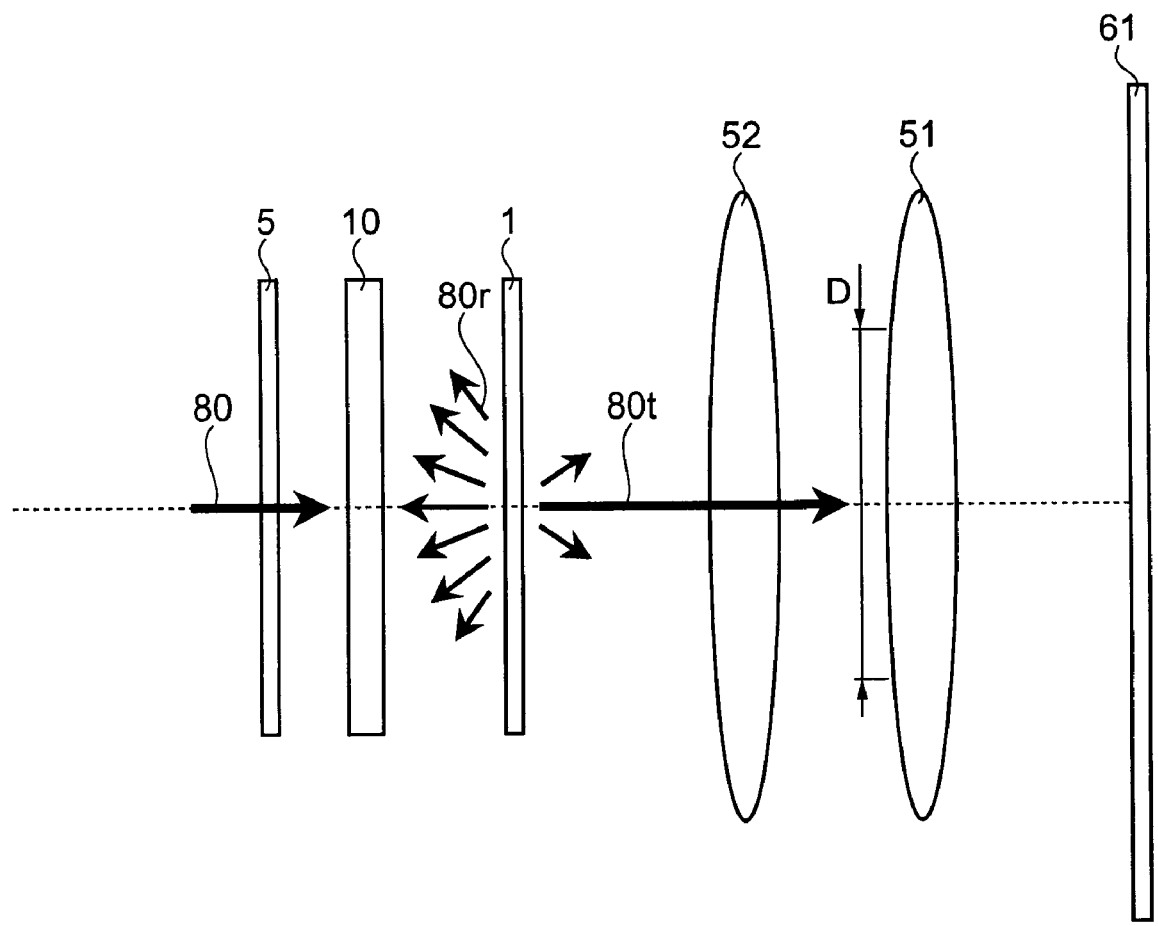
FIG. 19 is a schematic drawing illustrating an optical system of a projector that has a light-collecting lens.

A field lens 52 may be arranged as a collective lens at an optional position in the optical path between the optical element 1 and the projection lens 51 in the optical system of the projector 100 as shown in FIG. 19. Arranging the field lens 52 as described allows collecting more portion of the transmitted light 80t from the optical element 1 to the entrance pupil D of the projection lens 51. Consequently, the light usage efficiency is improved.

Fifth Modification

Figure 20A:
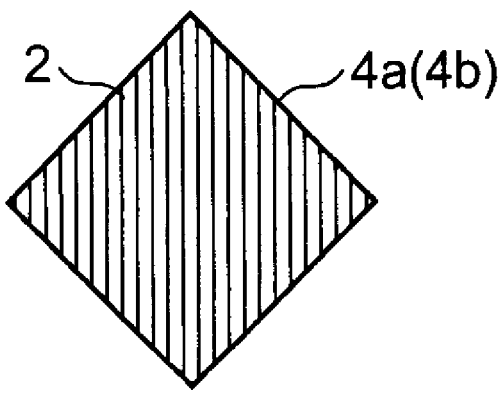
FIGS. 20A to 20C are drawings illustrating examples of the shapes of the minimum unit of the first region and of the second region in the diffractive functional layer, with respect to the direction in which fine wires are laid out forming a grid.
Figure 20B:
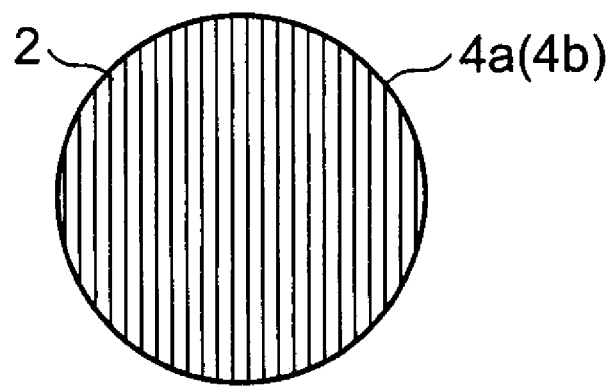
Figure 20C:
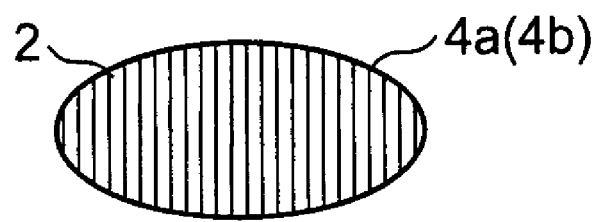

The configuration of the first regions 4a and the second regions 4b in the diffractive functional layer 4 in the above embodiment is either squares or shapes in which those squares are pieced together, and the fine wires included in the grid 2 are parallel to one side of the square, while various other structures may also be employed. FIGS. 20A to 20C are drawings illustrating examples of a relationship between the shape of the minimum unit of the first regions 4a and the second regions 4b in the diffractive functional layer 4 (hereafter referred to as "unit shape") and the direction in which fine wires included in the grid 2 extend.

The unit shape illustrated in FIG. 20A is square, and a side of this square is at an angle of 45 degrees with respect to the direction in which the fine wires of the grid 2 extend. In this structure, the linear border of the unit shape is not parallel to the fine wires. Therefore, the fine wires are not formed along the steps 8 of the diffractive functional layer 4, thereby avoiding defects of the fine wires arranged in the vicinity of the steps 8 to become unstable.

Unit shapes illustrated in FIGS. 20B and 20C are respectively circle and oval. In such configuration, the fine wires of the grid 2 are arranged at an angle with respect to the periphery of the unit shape. Therefore, similar to FIG. 20A, the fine wires are formed in a stable manner.

Moreover, if the unit shape is a circle, the intensity distribution of the reflected light becomes isotropic. On the other hand, if the unit shape is anisotropic, for instance, rectangular or oval, the shape of the intensity distribution of the reflected light also becomes isotropic. In this case, the distribution widens in the direction in which the width of the unit shape is narrow, and contracts in the direction in which the width of the unit shape is wide.

Sixth Modification

In the optical system of the projector 100 in the embodiment, the wire-grid polarizer 5 is arranged at the side in which the light enters the liquid crystal device 10, while the optical element 1 is arranged at the side from which the light emits. Alternatively, two optical elements 1 may be arranged at both sides, i.e. an entry side and exit side in the liquid crystal device 10.

Seventh Modification

The depth of the concaves and convexes in the diffractive functional layer 4 may optionally be modified, according to a wavelength of an incident light. It is preferable that, according to formula (2), the depth formed by the relief patterns in the diffractive functional layer 4, i.e. the height g of the steps 8, be equal to $(2m+1)\lambda/4n$. In this formula, if, for instance, m=0 and the wavelengths $\lambda$ are set to a central wavelength of red, green, and blue light beams, such as 650 nm, 550 nm, and 450 nm, then the desirable value of the height g is obtained as g(R)=179 nm for red light, g(G)=152 nm for green light, and g(B)=124 nm for blue light. Consequently, the optical element 1 that is arranged facing the liquid crystal devices 10R, 10G, and 10B, obtains the diffractive functional layer 4 suitable for the wavelength of the incident light, and efficiently diffuses light by setting the height g of the steps 8 in the diffractive functional layer 4 in the above manner.

Eighth Modification

The light source of the projector 100 may be a laser. The half bandwidth of the wavelength spectrum is extremely narrow in laser light, and therefore light is controlled by the diffractive functional layer 4 in a suitable manner.

Ninth Modification

In the above embodiment, the optical element 1 is applied to the projector 100, while the projector 100 is one of the various examples for the application of the optical element 1. Another example include, for instance, a mobile liquid crystal displays that requires diffractive functional layers.

What is claimed is:

1. An optical element, comprising:
   a diffractive layer which diffracts at least part of incident light; and
   a grid formed on a first surface of the diffractive layer, the grid including a plurality of wires,
   wherein the optical element reflects a part of the incident light while transmitting another part of the incident light; and
   a relief pattern formed by a plurality of concave portions and a plurality of convex portions is distributed on the first surface of the diffractive layer;
   the relief pattern is repetitively arranged;
   a first portion of the plurality of wires is provided in a concave portion of the plurality of concave portions; and
   a second portion of the plurality of wires is provided in a convex portion of the plurality of convex portions.

2. The optical element according to claim 1, wherein a height relative to a second surface in a plurality of first regions of the optical element is different from a height of a plurality of second regions by $(2m+1)\lambda/4m$ being an integer greater than or equal to zero, $\lambda$ being a wavelength of the incident light, and n being a refraction index of the optical element.

3. The optical element according to claim 1, wherein a height relative to a second surface in a plurality of first regions of the optical element is different from a height of a plurality of second regions by $(m+1)\lambda/(N-1)$, m being an integer greater than or equal to zero, $\lambda$ being the wavelength of the incident light, and N being a refraction index of the diffractive layer.

4. The optical element according to claim 1, wherein a plane defined by a height of a plurality of first regions and a plane defined by a height of a plurality of second regions are parallel.

5. The optical element according to claim 1, wherein a plurality of first regions are irregularly arranged on the first surface.

* * * * *